(12) United States Patent
Kigure

(10) Patent No.: US 10,900,985 B2
(45) Date of Patent: Jan. 26, 2021

(54) PHYSICAL QUANTITY SENSOR, INERTIA MEASUREMENT DEVICE, VEHICLE POSITIONING DEVICE, ELECTRONIC APPARATUS, AND VEHICLE

(71) Applicant: Seiko Epson Corporation, Tokyo (JP)

(72) Inventor: Shota Kigure, Shiojiri (JP)

(73) Assignee: Seiko Epson Corporation

( * ) Notice: Subject to any disclaimer, the term of this patent is extended or adjusted under 35 U.S.C. 154(b) by 126 days.

(21) Appl. No.: 16/143,538

(22) Filed: Sep. 27, 2018

(65) Prior Publication Data

US 2019/0101562 A1 Apr. 4, 2019

(30) Foreign Application Priority Data

Sep. 29, 2017 (JP) ................................ 2017-190491

(51) Int. Cl.
| | |
|---|---|
| *G01C 19/5769* | (2012.01) |
| *G01S 19/49* | (2010.01) |
| *G01P 1/02* | (2006.01) |
| *G01S 19/47* | (2010.01) |
| *G01P 15/18* | (2013.01) |
| *G01P 15/08* | (2006.01) |
| *G01P 15/125* | (2006.01) |

(52) U.S. Cl.
CPC .......... *G01P 1/023* (2013.01); *G01P 15/0802* (2013.01); *G01P 15/125* (2013.01); *G01P 15/18* (2013.01); *G01S 19/47* (2013.01)

(58) Field of Classification Search
CPC ... G01L 19/003; G01L 19/147; G01L 19/141; G01L 19/148; Y10T 29/49103; Y10T 29/49774; Y10T 29/49927; Y10T 29/49918; B82B 2201/0264; B81C 1/0023
See application file for complete search history.

(56) References Cited

U.S. PATENT DOCUMENTS

| | | | | |
|---|---|---|---|---|
| 2009/0199637 A1* | 8/2009 | Sugiura | ............... | G01P 15/0802 73/514.32 |
| 2011/0100126 A1* | 5/2011 | Jeong | ................. | G01C 19/5719 73/514.32 |
| 2015/0040667 A1* | 2/2015 | Tanaka | ................... | G01P 15/125 73/514.32 |
| 2016/0047839 A1* | 2/2016 | Tanaka | ............... | G01C 19/5755 73/514.32 |
| 2017/0199217 A1 | 7/2017 | Naruse et al. | | |

FOREIGN PATENT DOCUMENTS

| | | |
|---|---|---|
| JP | 2006-250702 A | 9/2006 |
| JP | 2017-133945 A | 8/2017 |

* cited by examiner

*Primary Examiner* — Brandi N Hopkins
(74) *Attorney, Agent, or Firm* — Harness, Dickey & Pierce, P.L.C.

(57) ABSTRACT

A physical quantity sensor includes a substrate, a first sensor element that is positioned on one main surface of the substrate and includes a first fixed portion fixed to the substrate, a second sensor element that is positioned on the one main surface of the substrate and includes a second fixed portion fixed to the substrate, a first recess portion that is open to the other main surface of the substrate and is disposed so as to overlap the first fixed portion in plan view of the substrate, and a second recess portion that is open to the other main surface of the substrate and is disposed so as to overlap the second fixed portion in plan view of the substrate, and in which the first recess portion and the second recess portion are disposed so as to be separated from each other.

20 Claims, 20 Drawing Sheets

PHYSICAL QUANTITY SENSOR, INERTIA MEASUREMENT DEVICE, VEHICLE POSITIONING DEVICE, ELECTRONIC APPARATUS, AND VEHICLE

CROSS-REFERENCE TO RELATED APPLICATION

This nonprovisional application claims the benefit of Japanese Patent Application No. 2017-190491 filed Sep. 29, 2017, the entire disclosure of which is incorporated herein by reference.

BACKGROUND

1. Technical Field

The present invention relates to a physical quantity sensor, an inertia measurement device, a vehicle positioning device, an electronic apparatus, and a vehicle.

2. Related Art

For example, an acceleration sensor described in JP-A-2006-250702 includes a sensor main body formed by sandwiching a sensor chip between glass substrates from both sides, and a spot face is formed on the bottom surface of the sensor main body. The bottom surface of the sensor main body is bonded to the bottom surface of a concave package with an adhesive. As such, the spot face is formed on the bottom surface of the sensor main body, so that the spot face relaxes stress and stress is hardly applied to the sensor main body.

However, in the acceleration sensor described in JP-A-2006-250702, the spot face is formed too large and a bonding area between the sensor main body and the package is reduced by an amount corresponding to a formed size of the spot face. For that reason, bonding strength between the sensor main body and the package is lowered.

SUMMARY

An advantage of some aspects of the invention is to provide a physical quantity sensor which is hard to transmit stress to the sensor main body and is excellent in the bonding strength between the sensor main body and the package, an inertia measurement device, a vehicle positioning device, an electronic apparatus, and a vehicle.

The advantage of some aspects of the invention can be achieved by the following configurations.

A physical quantity sensor according to an aspect of the invention includes a substrate, a first sensor element that is positioned on one main surface side of the substrate and includes a first fixed portion fixed to the substrate, a second sensor element that is positioned on the one main surface side of the substrate and includes a second fixed portion fixed to the substrate, a first recess portion that is open to the other main surface side of the substrate and is disposed so as to overlap the first fixed portion in plan view of the substrate, and a second recess portion that is open to the other main surface side of the substrate and overlaps the second fixed portion in plan view of the substrate, and in which the first recess portion and the second recess portion are disposed so as to be separated from each other.

With this configuration, if the substrate is bonded to a support substrate from the other main surface side of the substrate, it is possible to absorb and relax stress caused by thermal distortion of the support substrate and the like by the first recess portion and the second recess portion. For that reason, it is difficult for stress to be transmitted to the first and second sensor elements, and a target physical quantity can be accurately measured by the first and second sensor elements. Since the first and second recess portions are disposed so as to be separated from each other, an area of the other surface of the substrate can be left sufficiently large, and the bonding strength between the support substrate and the substrate is excellent.

In the physical quantity sensor according to the aspect of the invention, it is preferable that in plan view of the substrate, the first recess portion includes the first sensor element, and the second recess portion includes the second sensor element.

With this configuration, it is possible to more effectively absorb and relax stress caused by thermal distortion of the support substrate or the like by the first recess portion and the second recess portion.

In the physical quantity sensor according to the aspect of the invention, it is preferable that each of the first recess portion and the second recess portion is a closed recess portion that is not open to a side surface of the substrate.

With this configuration, the area of the other surface of the substrate can be left sufficiently large, and the bonding strength between the support substrate and the substrate is further improved.

In the physical quantity sensor according to the aspect of the invention, it is preferable that when a depth of each of the first recess portion and the second recess portion is D and a thickness of the substrate is T, a relationship of $0.1\,T \leq D \leq 0.2\,T$ is satisfied.

With this configuration, it is possible to sufficiently deepen the first and second recess portions while sufficiently maintaining mechanical strength of the substrate.

In the physical quantity sensor according to the aspect of the invention, it is preferable that a third sensor element that is positioned on the one main surface side of the substrate and includes a third fixed portion fixed to the substrate and a third recess portion that is open to the other main surface side of the substrate and is disposed so as to overlap the third fixed portion in plan view of the substrate are included, and the third recess portion is separated from each of the first recess portion and the second recess portion.

With this configuration, it is possible to absorb and relax the stress caused by thermal distortion of the support substrate or the like by the third recess portion. For that reason, it is difficult for the stress to be transmitted to the third sensor element, and the target physical quantity can be accurately measured by the third sensor element.

In the physical quantity sensor according to the aspect of the invention, it is preferable that in plan view of the substrate, the third recess portion includes the third sensor element.

With this configuration, it is possible to more effectively absorb and relax the stress caused by thermal distortion or the like of the support substrate by the third recess portion.

In the physical quantity sensor according to the aspect of the invention, it is preferable that the third recess portion is a closed recess portion that is not open to the side surface of the substrate.

With this configuration, the area of the other surface of the substrate can be left sufficiently large, and the bonding strength between the support substrate and the substrate is further improved.

In the physical quantity sensor according to the aspect of the invention, it is preferable that a support substrate that is disposed on the other main surface side of the substrate and a bonding member that is positioned between the support substrate and the substrate and bonds a main surface on the substrate side of the support substrate and the other main surface of the substrate are included, and each of the bottom surfaces of the first recess portion and the second recess portion is separated from the support substrate.

With this configuration, it is possible to absorb and relax the stress caused by thermal distortion of the support substrate by the first recess portion and the second recess portion. For that reason, it is difficult for the stress to be transmitted to the first and second sensor elements, and the target physical quantity can be accurately measured by the first and second sensor elements.

An inertia measurement device according to another aspect includes the physical quantity sensor according to the aspect of the invention and a control circuit that controls driving of the physical quantity sensor.

With this configuration, it is possible to obtain the effect of the physical quantity sensor and to obtain an inertia measurement device with high reliability.

A vehicle positioning device according to another aspect of the invention includes the inertia measurement device according to the aspect of the invention, a reception unit that receives a satellite signal on which position information is superimposed from a positioning satellite, an acquisition unit that acquires position information of the reception unit based on the received satellite signal, a computation unit that computes an attitude of the vehicle based on inertia data output from the inertia measurement device, and a calculation unit that calculates a position of the vehicle by correcting the position information based on the calculated attitude.

With this configuration, it is possible to obtain the effect of the inertia measurement device and to obtain a vehicle positioning device with high reliability.

An electronic apparatus according to another aspect of the invention includes the physical quantity sensor according to the aspect of the invention, a control circuit, and a correction circuit.

With this configuration, it is possible to obtain the effect of the physical quantity sensor and to obtain an electronic apparatus with high reliability.

A vehicle according to another aspect of the invention includes the physical quantity sensor according to the aspect of the invention and an attitude control unit.

With this configuration, it is possible to obtain the effect of the physical quantity sensor and to obtain a vehicle with high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity sensor, an inertia measurement device, a vehicle positioning device, an electronic apparatus, and a vehicle according to the invention will be described in detail based on the embodiments illustrated in the accompanying drawings.

First Embodiment

Figure 1:
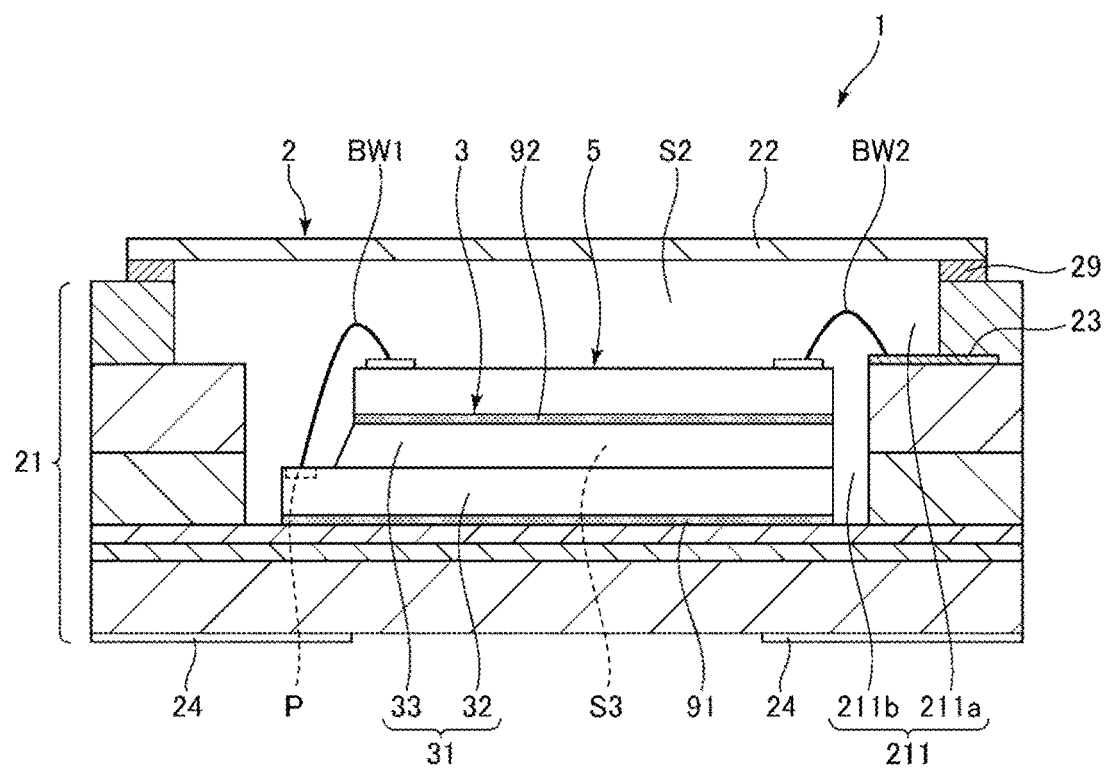
FIG. 1 is a cross-sectional view illustrating a physical quantity sensor according to a first embodiment.
Figure 2:
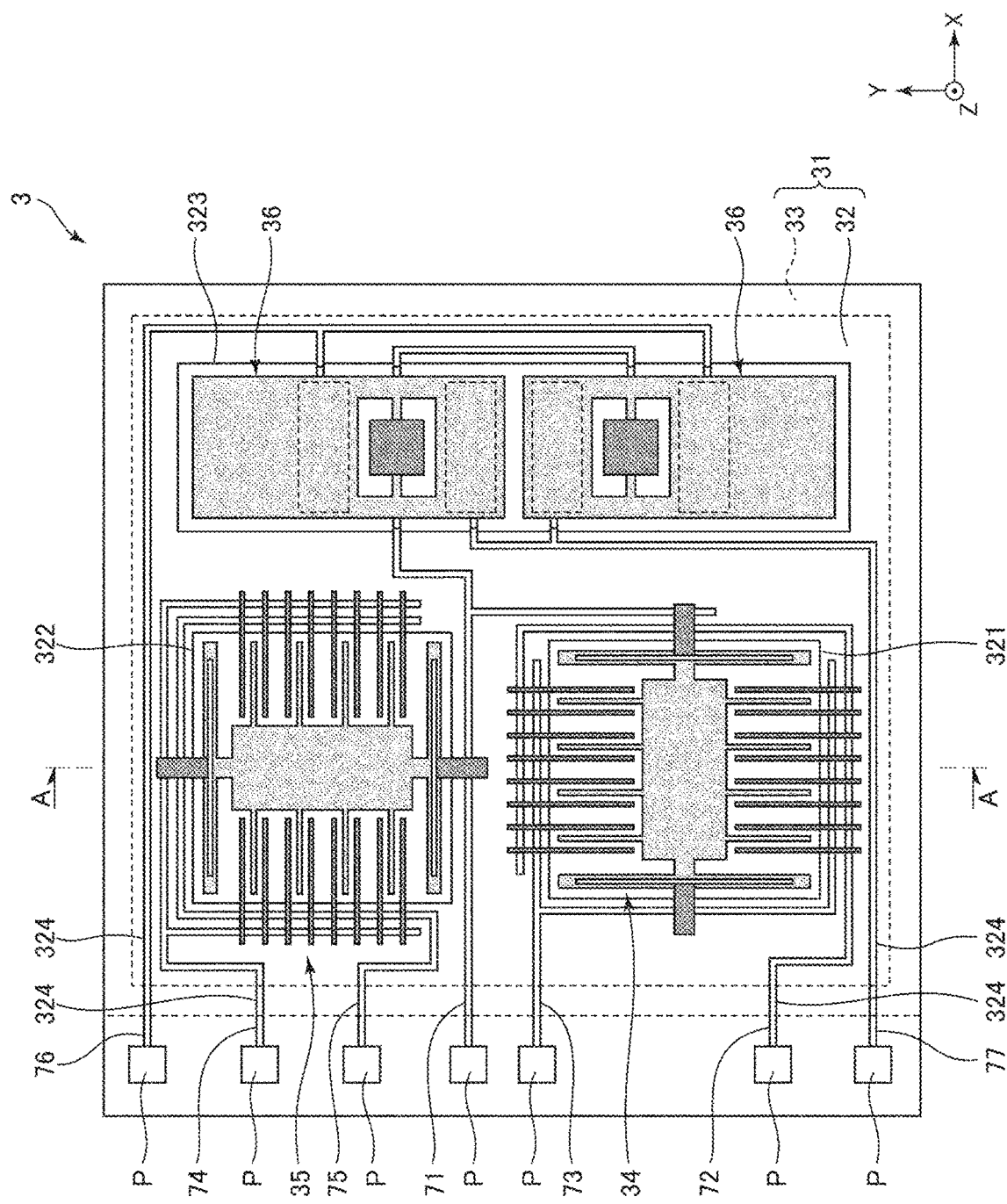
FIG. 2 is a plan view of an acceleration sensor included in the physical quantity sensor illustrated in FIG. 1.
Figure 3:
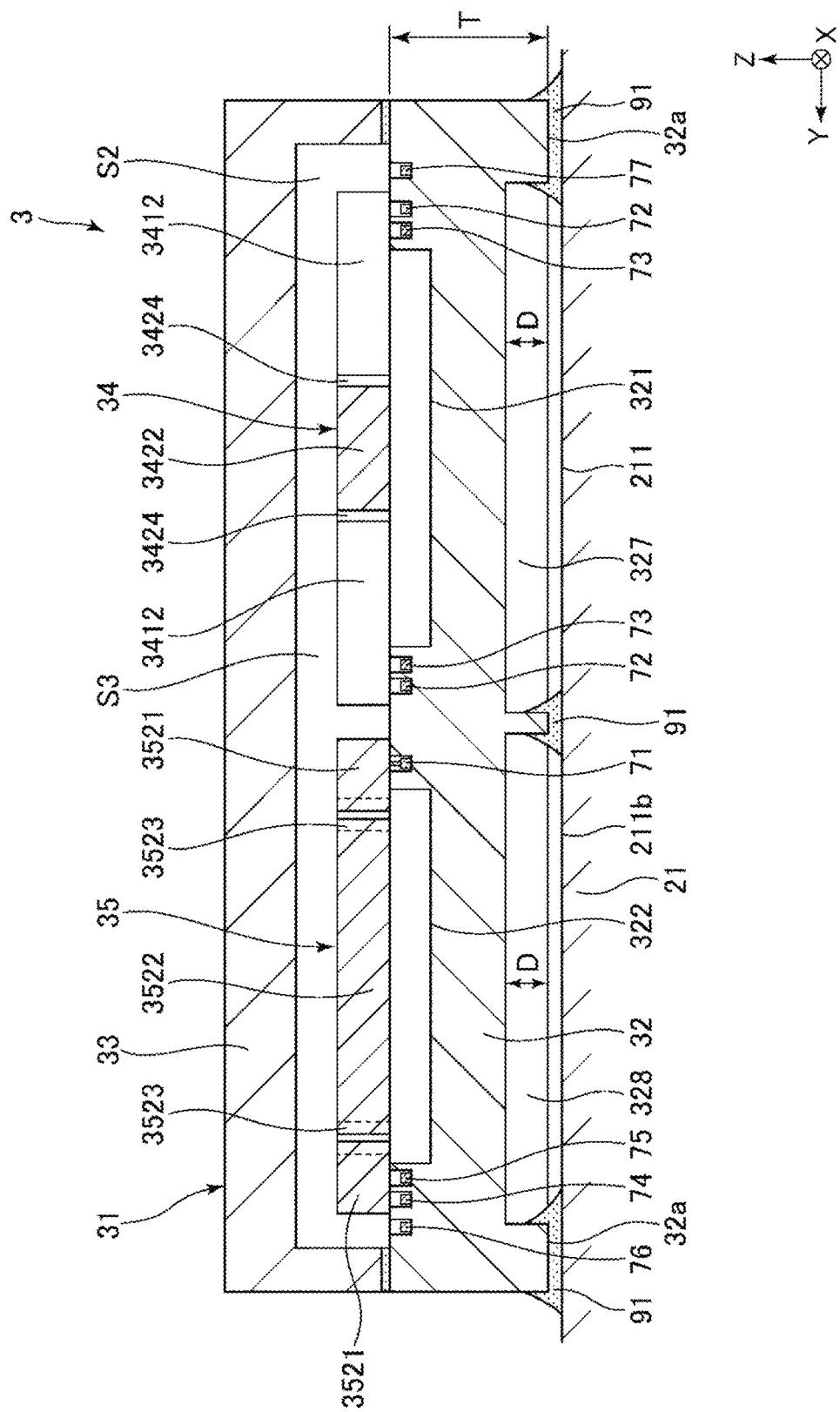
FIG. 3 is a cross-sectional view taken along line A-A in FIG. 2.
Figure 4:
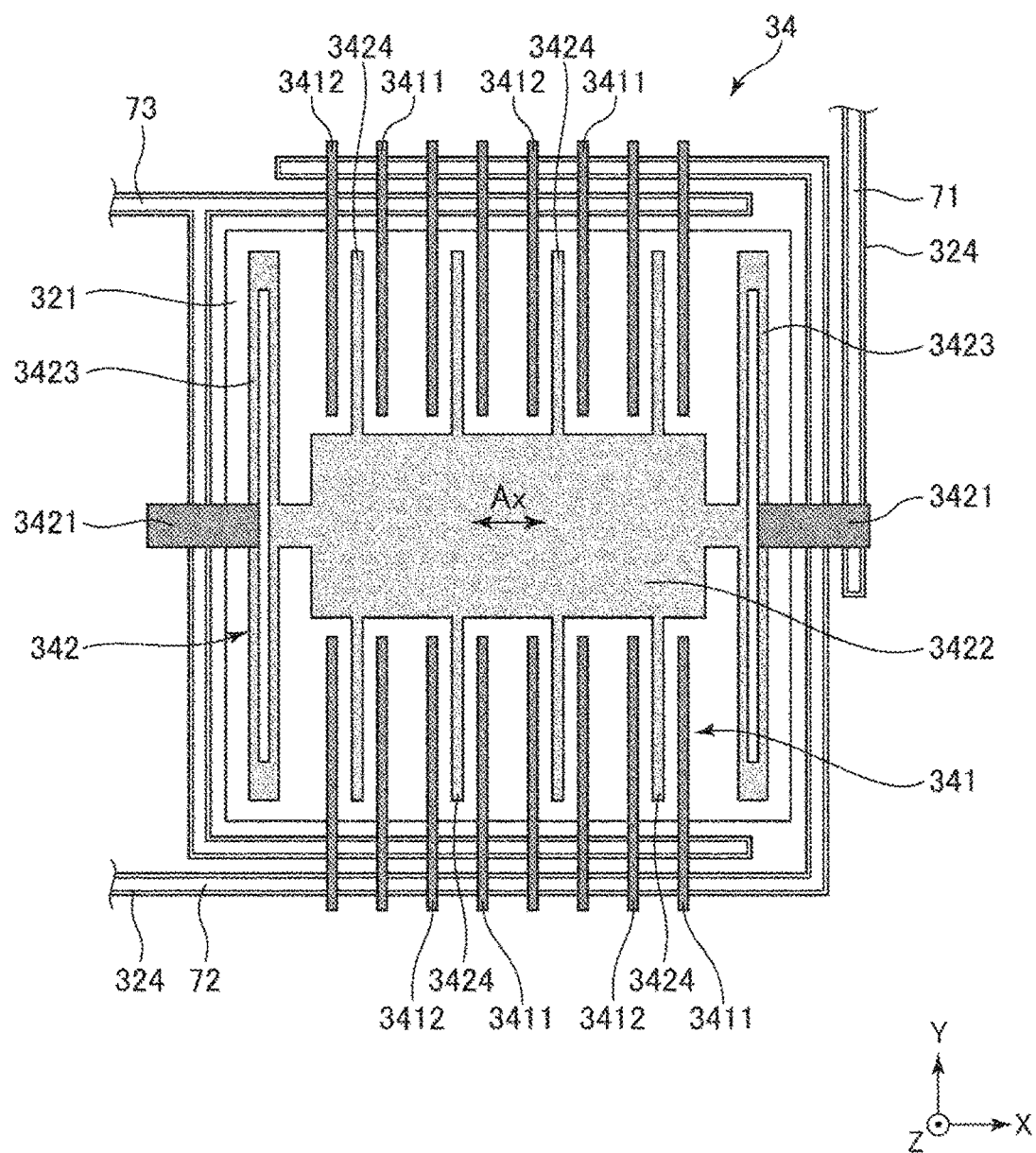
FIG. 4 is a plan view of a sensor element included in the acceleration sensor illustrated in FIG. 2.
Figure 5:
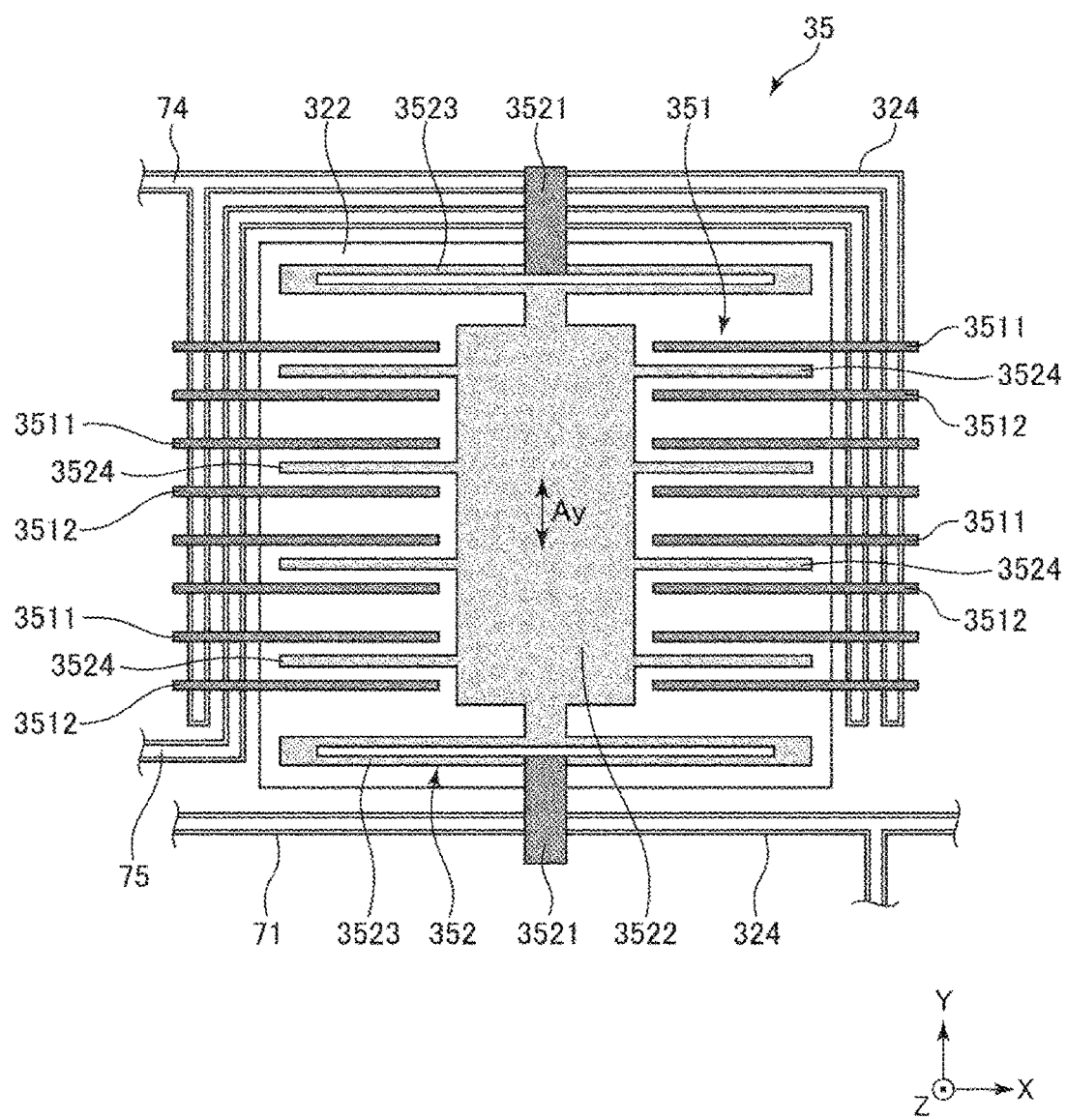
FIG. 5 is another plan view of the sensor element included in the acceleration sensor illustrated in FIG. 2.
Figure 6:
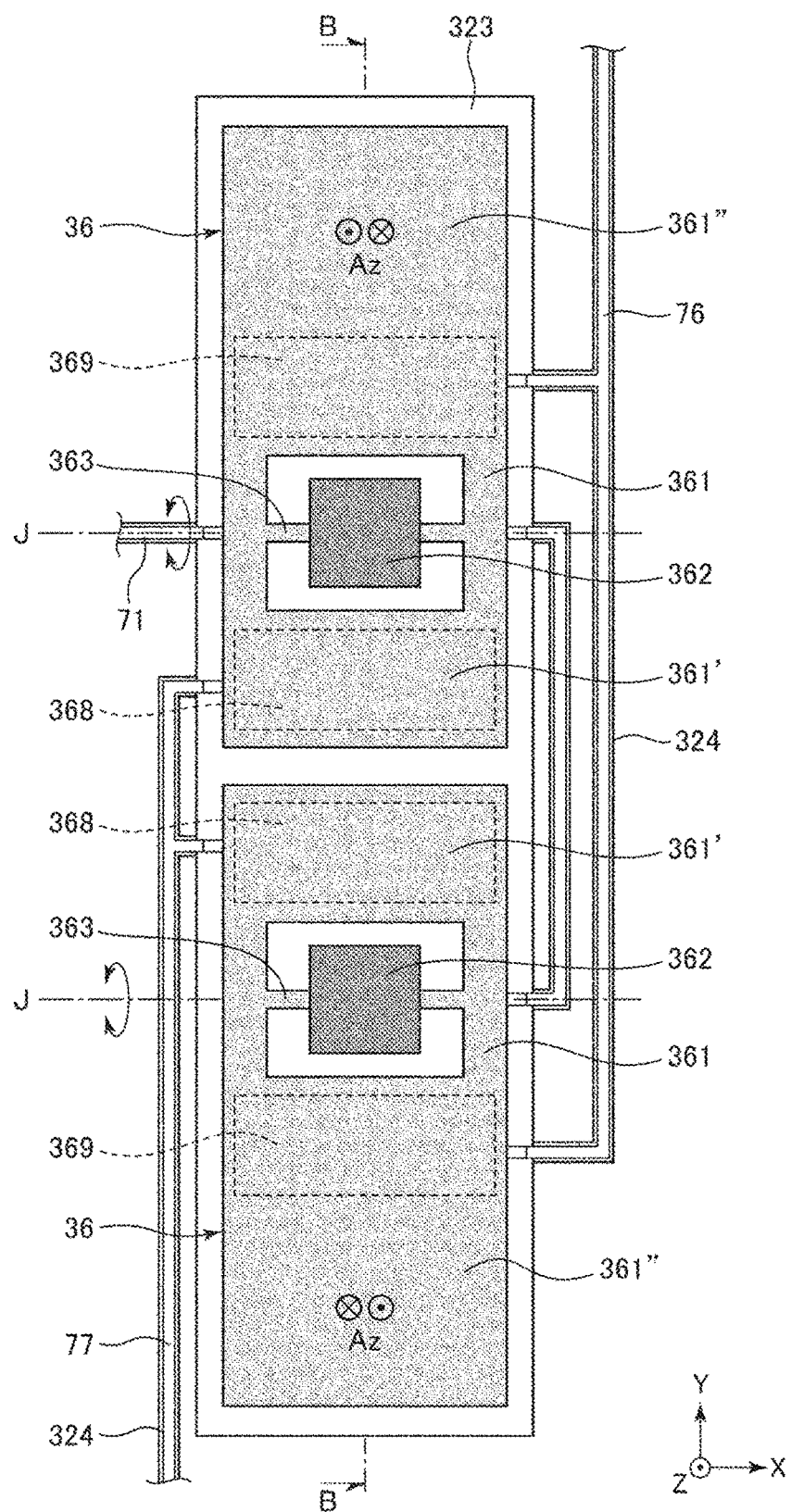
FIG. 6 is another plan view of the sensor element included in the acceleration sensor illustrated in FIG. 2.
Figure 7:
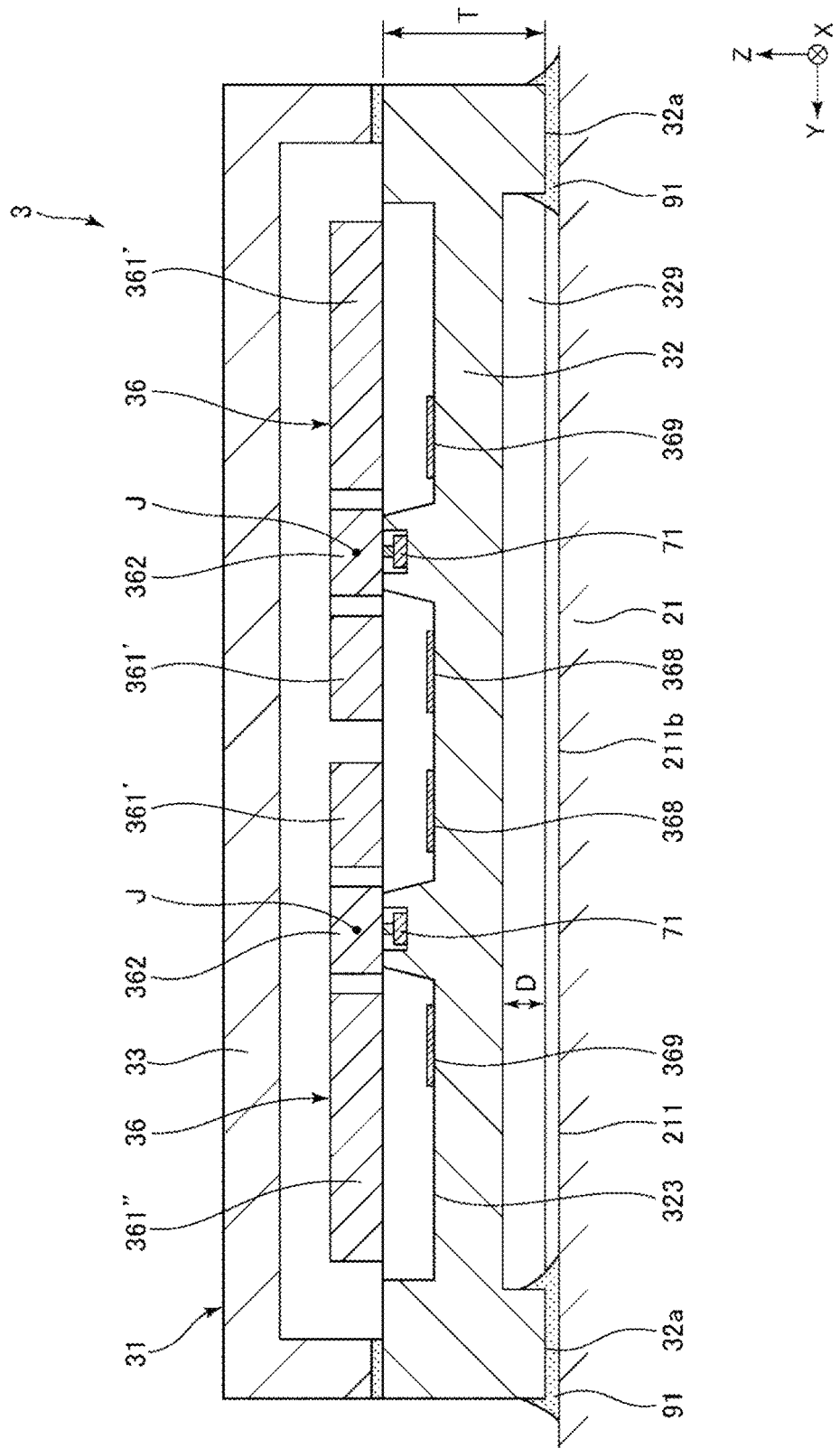
FIG. 7 is a cross-sectional view taken along line B-B in FIG. 6.
Figure 8:
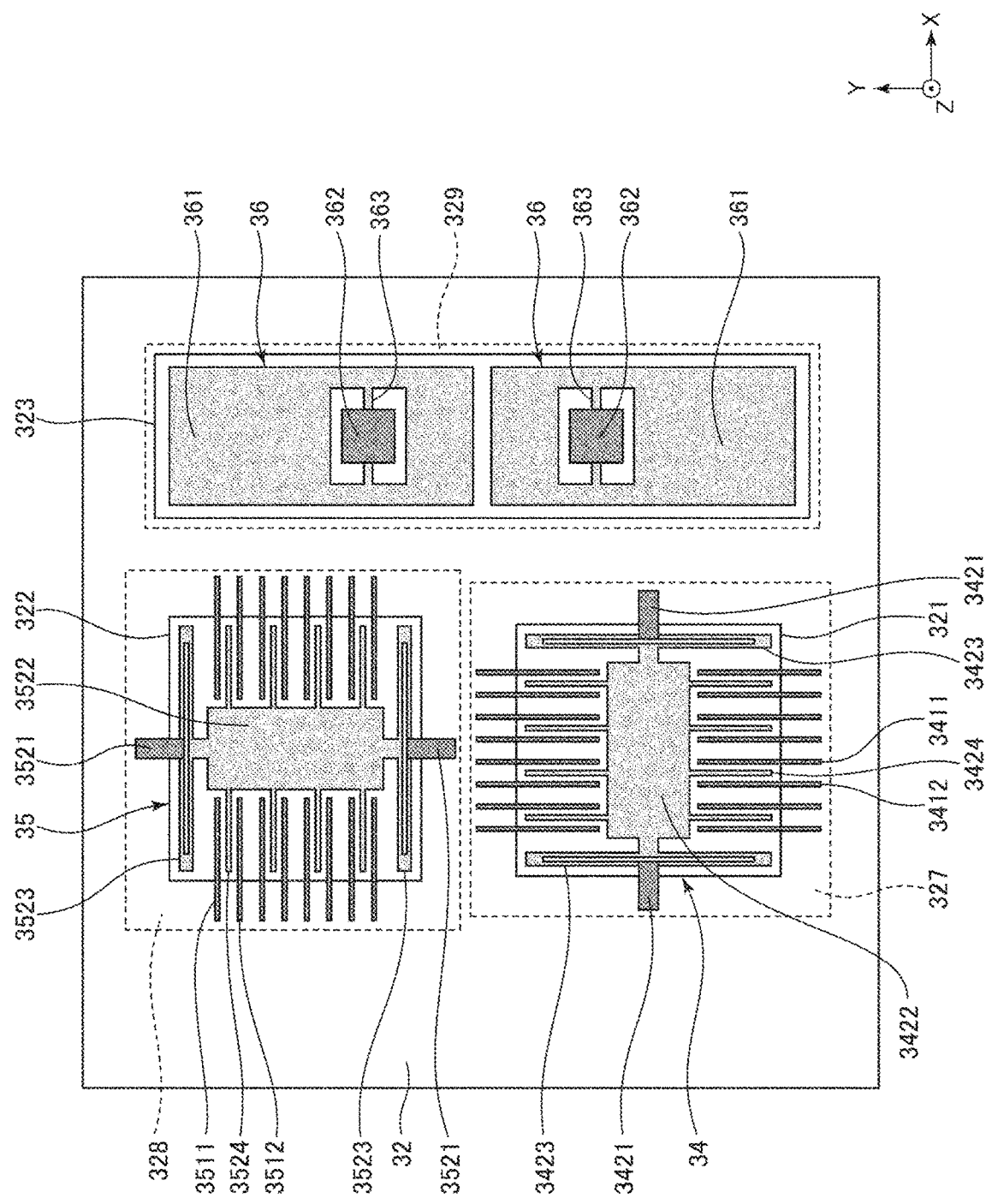
FIG. 8 is a plan view illustrating a recess portion included in the acceleration sensor.
Figure 9:
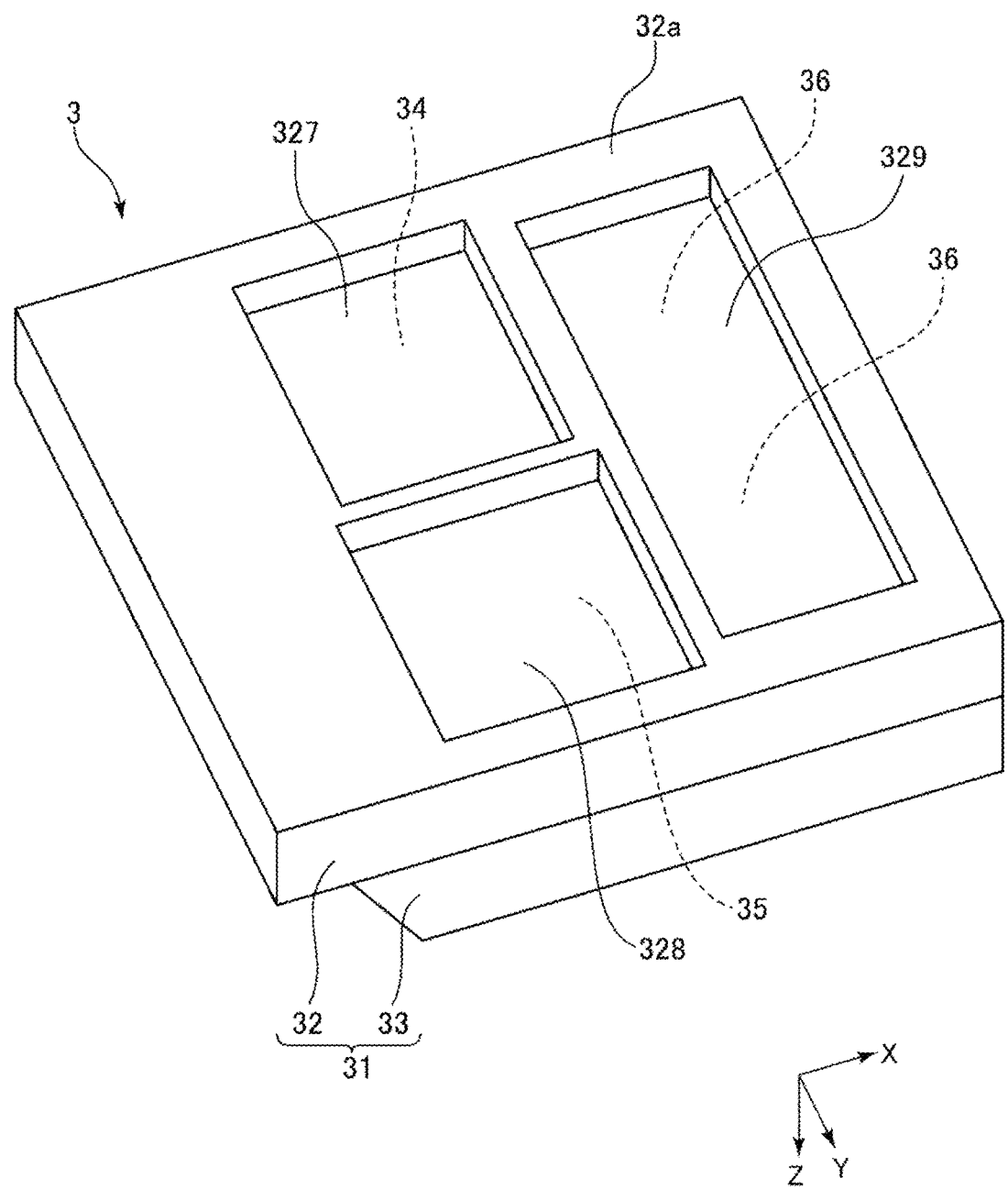
FIG. 9 is a perspective view of the acceleration sensor.
Figure 10:
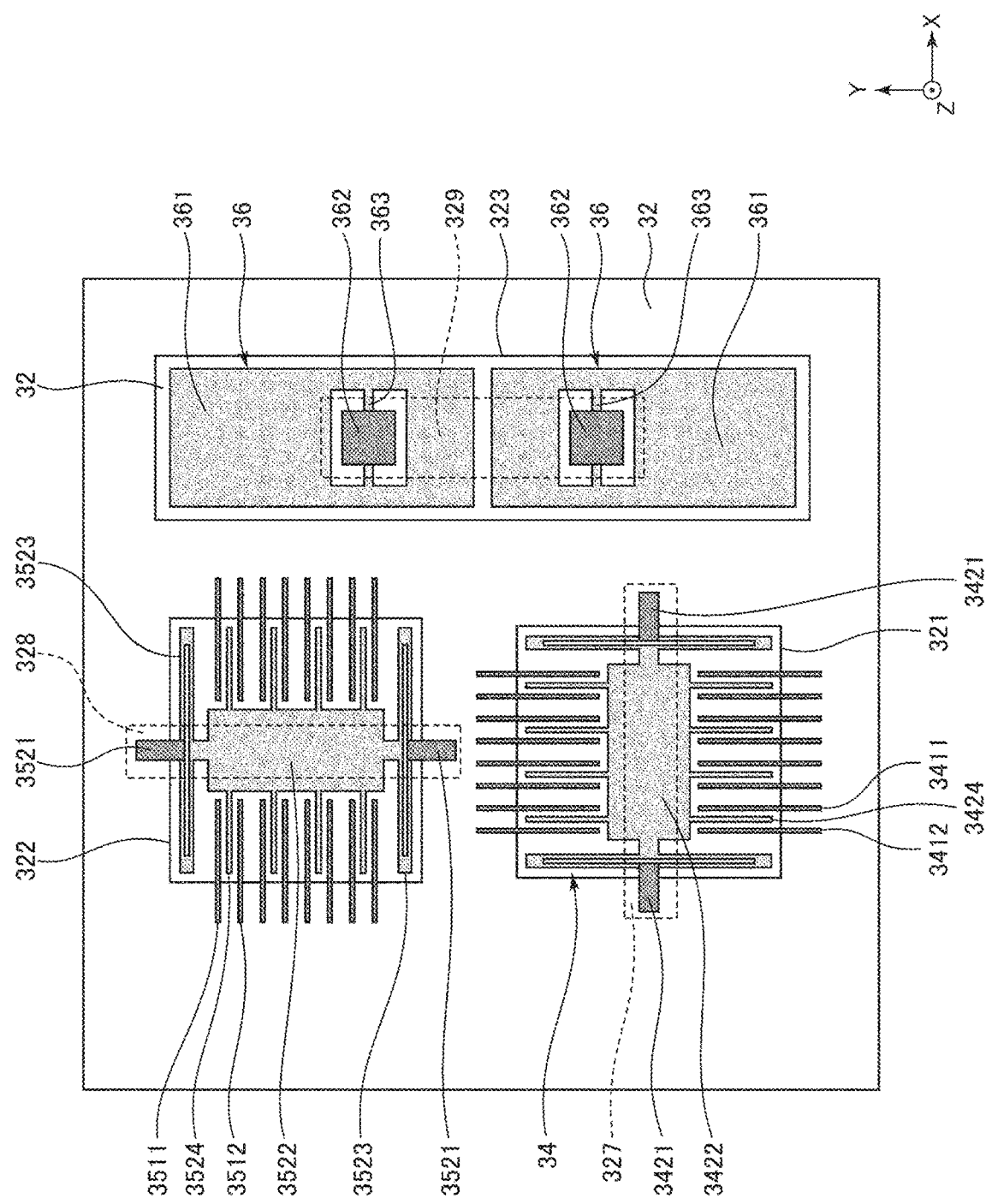
FIG. 10 is a plan view illustrating a modification example of the recess portion illustrated in FIG. 8.
Figure 11:
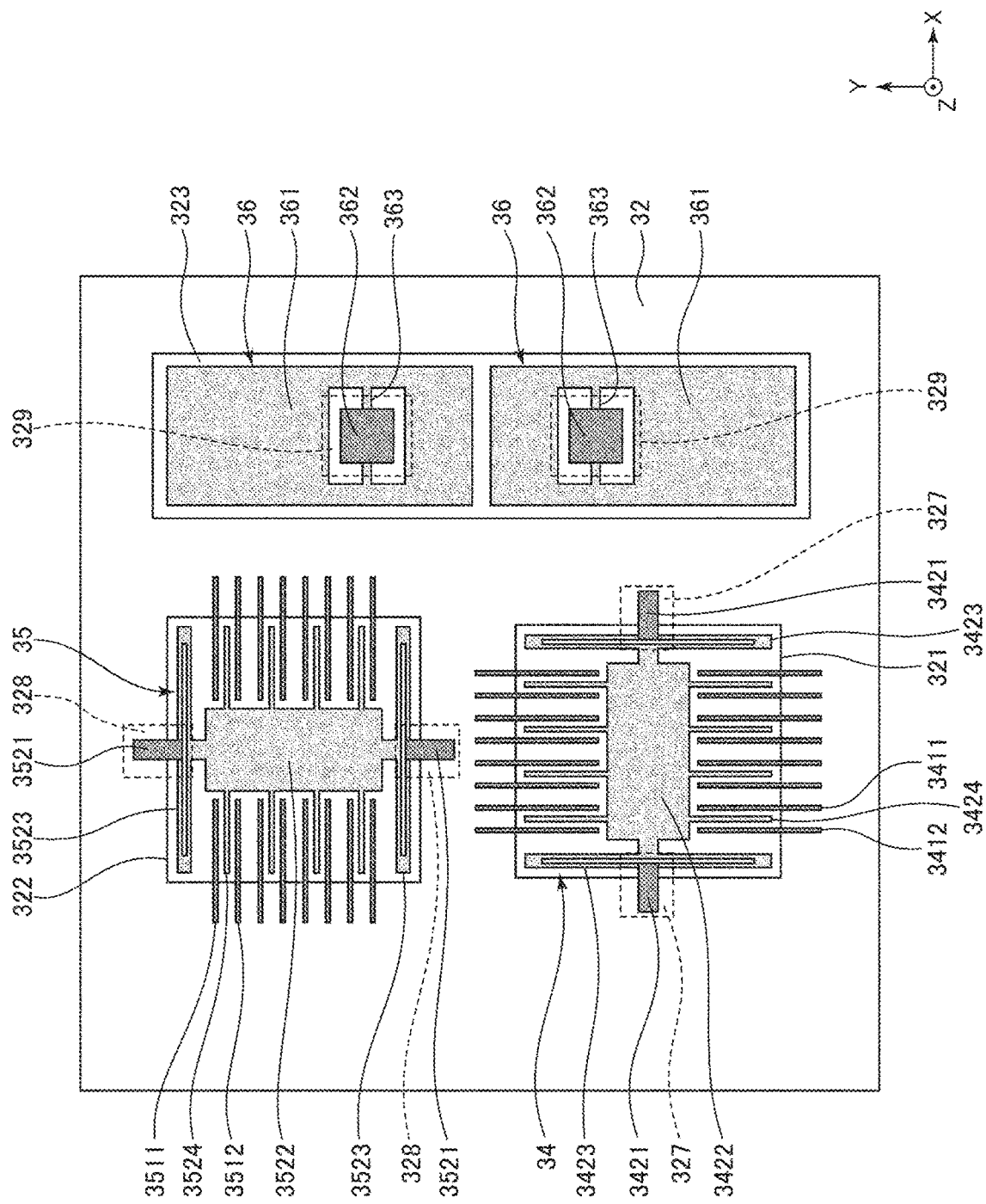
FIG. 11 is another plan view illustrating the modification example of the recess portion illustrated in FIG. 8.
Figure 12A:
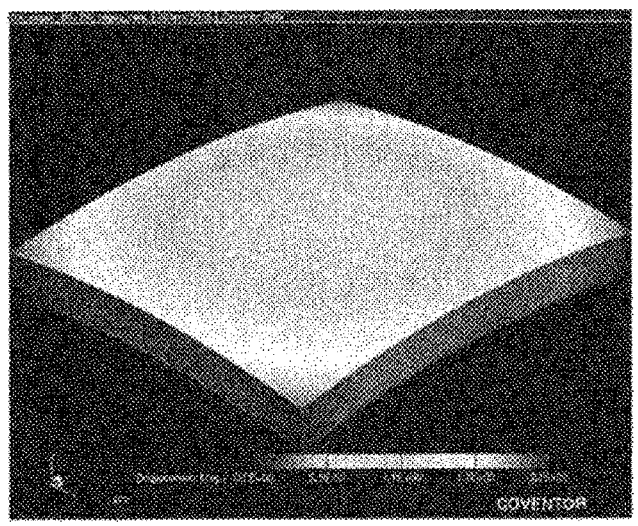
FIGS. 12A to 12C are a view illustrating simulation results.
Figure 12B:
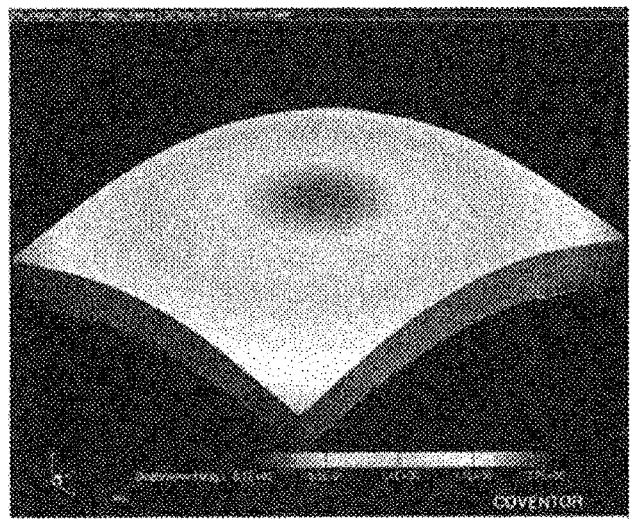
Figure 12C:
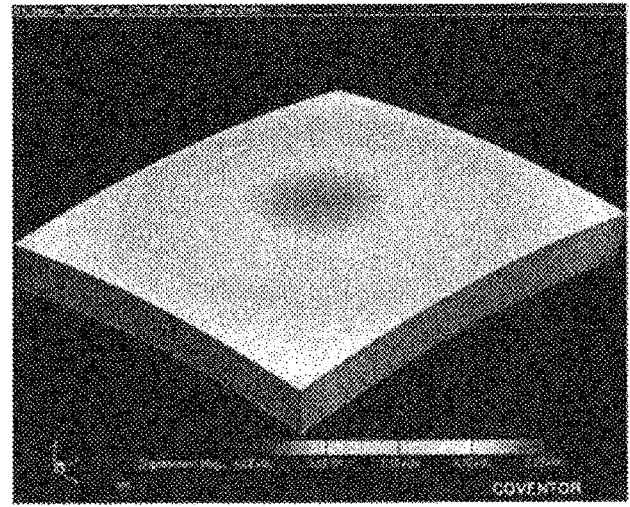

FIG. 1 is a cross-sectional view illustrating a physical quantity sensor according to a first embodiment. FIG. 2 is a plan view of an acceleration sensor included in the physical quantity sensor illustrated in FIG. 1. FIG. 3 is a cross-sectional view taken along line A-A in FIG. 2. Each of FIGS. 4 to 6 is a plan view of a sensor element included in the acceleration sensor illustrated in FIG. 2. FIG. 7 is a cross-sectional view taken along line B-B in FIG. 6. FIG. 8 is a plan view illustrating a recess portion included in the acceleration sensor. FIG. 9 is a perspective view of the acceleration sensor. Each of FIGS. 10 to 11 is a plan view illustrating a modification example of the recess portion illustrated in FIG. 8. FIGS. 12A, 12B, 12C are views illustrating simulation results.

For convenience of explanation, in each drawing, the X-axis, Y-axis, and Z-axis are illustrated as three axes orthogonal to each other. A direction parallel to the X-axis is referred to as an "X-axis direction", a direction parallel to the Y-axis is referred to as a "Y-axis direction", and a direction parallel to the Z-axis is referred to as a "Z-axis direction". The tip end side of the arrow of each axis is also called "plus side", and the side opposite to the tip end side is also called "minus side". In addition, the plus side in the Z-axis direction is also referred to as "upper", and the minus side in the Z-axis direction is also referred to as "lower".

A physical quantity sensor 1 illustrated in FIG. 1 functions as a three-axis acceleration sensor 3. The physical quantity sensor 1 includes a package 2, the acceleration sensor 3 accommodated in the package 2, and a semiconductor element 5 (control IC chip).

The package 2 includes a cavity-shaped base 21 and a lid 22 bonded to the upper surface of the base 21. The base 21 includes a recess portion 211 that opens to its upper surface. A recess portion 211 includes a first recess portion 211a that opens to the upper surface of the base 21 and a second recess portion 211b that opens to the bottom surface of the first recess portion 211a.

On the other hand, the lid 22 includes a plate shape and is bonded to the upper surface of the base 21 so as to cover the opening of the recess portion 211. By covering the opening of the recess portion 211 by the lid 22, an accommodation space S2 is formed in the package 2, and the acceleration sensor 3 and the semiconductor element 5 are stored in the accommodation space S2. For that reason, it is possible to suitably protect the acceleration sensor and the semiconductor element 5 from impact, dust, humidity (moisture), and the like by the package 2. A method of bonding the base 21 and the lid 22 is not particularly limited, and seam welding via a seam ring 29 is used in the first embodiment.

The accommodation space S2 is airtightly sealed. An atmosphere in the accommodation space S2 is not particularly limited, but it is preferable that the atmosphere is the same as an internal space S3 of the acceleration sensor 3. With this configuration, even if airtightness of the internal space S3 collapses and the internal space S3 and the accommodation space S2 communicate with each other, the atmosphere of the internal space S3 can be maintained as it is. For that reason, change in acceleration detection characteristics of the acceleration sensor 3 due to change in the atmosphere of the internal space S3 can be suppressed and thus, the physical quantity sensor 1 having stable acceleration detection characteristics is obtained.

The constituent material of the base 21 is not particularly limited, and various ceramics such as alumina, zirconia, titania, and the like can be used, for example. In this case, the base 21 can be manufactured by firing a laminate of the ceramic sheet (green sheet). By manufacturing in this way, it is possible to easily form the recess portion 211. The constituent material of the lid 22 is not particularly limited, but may be a member having a linear expansion coefficient close to that of the constituent material of the base 21. For example, in a case where the constituent material of the base 21 is ceramics as described above, it is preferable to use an alloy such as kovar.

The base 21 includes a plurality of internal terminals 23 disposed in the accommodation space S2 (bottom surface of the first recess portion 211a) and a plurality of external terminals 24 disposed on the bottom surface. Each internal terminal 23 is electrically connected to a predetermined external terminal 24 via an internal wiring (not illustrated) disposed in the base 21. The plurality of internal terminals 23 are electrically connected to the semiconductor element 5 via bonding wirings BW2, respectively. With this configuration, it is possible to electrically connect to the semiconductor element 5 from the outside of the package 2 via the external terminal 24, so that mounting of the physical quantity sensor 1 becomes easy.

The package 2 has been described as above. The package 2 is not particularly limited as long as it can accommodate the acceleration sensor 3 and the semiconductor element 5. For example, the accommodation space S2 may not be airtightly sealed.

The acceleration sensor 3 is bonded to the bottom surface of the second recess portion 211b via a bonding member 91 with the substrate 32 facing downward (bottom surface side of the recess portion 211). The bonding member 91 is not particularly limited, and various resin adhesives such as epoxy-based adhesive, acrylic-based, silicone-based, and the like, metal brazing material (gold brazing material, silver brazing material, and the like), solder, and the like can be used, for example.

The acceleration sensor 3 can measure acceleration Ax in the X-axis direction, acceleration Ay in the Y-axis direction, and acceleration Az in the Z-axis direction. As illustrated in FIG. 2, such an acceleration sensor 3 includes a package 31 and four sensor elements 34, 35, and accommodated in the package 31. Among the sensor elements 34, 35, and 36, the acceleration Ax is measured by the sensor element 34 (first sensor element), the acceleration Ay is measured by the sensor element 35 (second sensor element), and the acceleration Az is measured by the sensor element 36 (third sensor element).

As illustrated in FIG. 3, the package 31 includes a substrate 32 and a lid 33 bonded to the upper surface of the substrate 32. As the substrate 32, for example, a glass substrate made of a glass material (for example, borosilicate glass such as Pyrex glass (registered trademark) and Tempax glass (registered trademark)) containing alkali metal ions can be used. As the lid 33, for example, a silicon substrate can be used. However, the constituent material of the substrate 32 and the lid 33 is not particularly limited, and a silicon substrate, a glass substrate, a ceramic substrate, or the like can be used.

It is preferable that the internal space S3 of the package 31 is an airtight space and is filled with an inert gas such as nitrogen, helium, argon, and the like, and is substantially at atmospheric pressure at usage temperature (about −40° C. to 80° C.). With this configuration, viscous resistance is increased and a damping effect is exhibited, and vibrations of the sensor elements 34, 35, and 36 can be promptly converged. For that reason, measurement accuracy of the accelerations Ax, Ay, and Az by the acceleration sensor 3 is improved.

Recess portions 321, 322, and 323 are formed on the upper surface (one main surface) of the substrate 32. The recess portion 321 is disposed so as to be overlapped with the sensor element 34 and functions as a relief portion for preventing contact with the sensor element 34. The recess portion 322 is disposed so as to be overlapped with the sensor element 35 and functions as a relief portion for preventing contact with the sensor element 35. The recess portion 323 is disposed so as to be overlapped with the sensor element 36 and functions as a relief portion for preventing contact with the sensor element 36. In the first embodiment, the main surfaces represent a surface having the largest area among the surfaces constituting the substrate and a surface opposite to the surface.

A plurality of grooves 324 are formed on the upper surface of the substrate 32, and wirings 71, 72, 73, 74, 75, 76, and 77 are disposed in these grooves 324. The wirings 71, 72, 73, 74, 75, 76, and 77 are electrically connected to the sensor elements 34, 35, and 36. One end portion of each of the wirings 71, 72, 73, 74, 75, 76, and 77 is positioned outside the package 31, and this portion functions as a connection pad P for electrical connection with the semiconductor element 5.

Next, the sensor elements 34, 35, and 36 will be briefly described. For example, the sensor elements 34, 35, and 36 can be formed in such a way that a silicon substrate bonded to the upper surface of the substrate 32 by being subjected to anode bonding and doped with impurities such as phosphorus (P), boron (B) or the like is subjected to patterning by using dry etching (especially, Bosch method).

The sensor element 34 is a sensor element for measuring the acceleration Ax in the X-axis direction. As illustrated in FIG. 4, the sensor element 34 includes a fixed electrode 341 fixed to the substrate 32 and a movable electrode 342 displaceable in the X-axis direction with respect to the substrate 32. The movable electrode 342 includes a pair of fixed portions 3421 fixed to the upper surface of the substrate 32, a movable portion 3422 that is displaceable in the X-axis direction with respect to the substrate 32, a pair of connection springs 3423 connecting the respective fixed portions 3421 and the movable portion 3422, and a plurality of movable electrode fingers 3424 disposed to extend from the movable portion 3422 to both sides in the Y-axis direction. Such a movable electrode 342 is electrically connected to the wiring 71 via a conductive bump (see FIG. 3).

The fixed electrode 341 includes a plurality of first fixed electrode fingers 3411 and a plurality of second fixed electrode fingers 3412. Each of the first fixed electrode fingers 3411 extends in the Y-axis direction and is fixed to the upper surface of the substrate 32 at one end side thereof. Each of the first fixed electrode fingers 3411 is positioned on the plus side in the X-axis direction with respect to the corresponding movable electrode finger 3424, and faces the corresponding movable electrode finger 3424 via a gap. Each of the second fixed electrode fingers 3412 extends in the Y-axis direction and is fixed to the upper surface of the substrate 32 at one end side thereof. Similarly, each of the second fixed electrode fingers 3412 is positioned on the minus side in the X-axis direction with respect to the corresponding movable electrode finger 3424, and faces the corresponding movable electrode finger 3424 via a gap.

Each of the first fixed electrode fingers 3411 is electrically connected to the wiring 72 via a conductive bump and each of the second fixed electrode fingers 3412 is electrically connected to the wiring 73 via a conductive bump. When the acceleration sensor 3 is driven, electrostatic capacitances are respectively formed between the movable electrode finger 3424 and the first fixed electrode finger 3411 and between the movable electrode finger 3424 and the second fixed electrode finger 3412.

When the acceleration Ax is applied to the sensor element 34, the movable portion 3422 is displaced in the X-axis direction while elastically deforming a connection spring 3423 based on magnitude of the acceleration Ax. The gap between the movable electrode finger 3424 and the first fixed electrode finger 3411 and the gap between the movable electrode finger 3424 and the second fixed electrode finger 3412 change according to the displacement of the movable portion 3422 and the electrostatic capacitance between the movable electrode finger 3424 and the first fixed electrode finger 3411 and the electrostatic capacitance between the movable electrode finger 3424 and the second fixed electrode finger 3412 change as the gap changes. Accordingly, it is possible to measure the acceleration Ax based on change in the electrostatic capacitance.

The sensor element 35 is a sensor element for measuring the acceleration Ay in the Y-axis direction. The sensor element 35 has the same configuration as that of the sensor element 34 described above except that the sensor element 35 is rotated by 90 degrees about the Z-axis.

As illustrated in FIG. 5, the sensor element 35 includes a fixed electrode 351 fixed to the upper surface of the substrate 32 and a movable electrode 352 displaceable in the X-axis direction with respect to the substrate 32. The movable electrode 352 includes a pair of fixed portions 3521 fixed to the upper surface of the substrate 32, a movable portion 3522 that is displaceable in the Y-axis direction with respect to the substrate 32, a pair of connection springs 3523 connecting the respective fixed portions 3521 and the movable portion 3522, and a plurality of movable electrode fingers 3524 disposed to extend from the movable portion 3522 to both sides in the X-axis direction. Such a movable electrode 352 is electrically connected to the wiring 71 via a conductive bump.

The fixed electrode 351 includes a plurality of first fixed electrode fingers 3511 and a plurality of second fixed electrode fingers 3512. Each of the first fixed electrode fingers 3511 extends in the X-axis direction and is fixed to the upper surface of the substrate 32 at one end side thereof. Each of the first fixed electrode fingers 3511 is positioned on the plus side in the Y-axis direction with respect to the corresponding movable electrode finger 3524, and faces the corresponding movable electrode finger 3524 via a gap. Similarly, each second fixed electrode finger 3512 extends in the X-axis direction and is fixed to the upper surface of the substrate 32 at one end side thereof. Each of the second fixed electrode fingers 3512 is positioned on the minus side in the Y-axis direction with respect to the corresponding movable electrode finger 3524, and faces the corresponding movable electrode finger 3524 via a gap.

Each of the first fixed electrode fingers 3511 is electrically connected to the wiring 74 via a conductive bump and each of the second fixed electrode fingers 3512 is electrically connected to the wiring 75 via a conductive bump. When the acceleration sensor 3 is driven, electrostatic capacitances are respectively formed between the movable electrode finger 3524 and the first fixed electrode finger 3511 and between the movable electrode finger 3524 and the second fixed electrode finger 3512.

When the acceleration Ay is applied to the sensor element 35, the movable portion 3522 is displaced in the Y-axis direction while elastically deforming a connection spring 3523 based on magnitude of the acceleration Ay. The gap between the movable electrode finger 3524 and the first fixed electrode finger 3511 and the gap between the movable electrode finger 3524 and the second fixed electrode finger 3512 change according to displacement of the movable portion 3522, and the electrostatic capacitance between the movable electrode finger 3524 and the first fixed electrode finger 3511 and the electrostatic capacitance between the movable electrode finger 3524 and the second fixed electrode finger 3512 change as the gap changes. Accordingly, it is possible to measure the acceleration Ay based on change in the electrostatic capacitance.

The sensor element 36 is a sensor element for measuring the acceleration Az in the Z-axis direction. As illustrated in FIG. 6, a pair of sensor elements 36 are provided. Each of the pair of sensor elements 36 includes a plate-shaped movable portion 361, a fixed portion 362 fixed to the upper surface of the substrate 32, and a beam 363 connecting the movable portion 361 and the fixed portion 362.

Further, the movable portion 361 includes a first movable electrode 361' and a second movable electrode 361" which are positioned on opposite sides to each other via a rotation axis J formed by the beam 363. The first movable electrode 361' and second movable electrode 361" have different rotational moments when the acceleration Az is applied. For that reason, when the acceleration Az is applied, the movable portion 361 swings around the rotation axis J in a see-saw fashion. Each of the pair of sensor elements 36 is electrically connected to the wiring 71 via a conductive bump (see FIG. 7).

As illustrated in FIG. 7, a first fixed electrode 368 facing the first movable electrode 361' and a second fixed electrode 369 facing the second movable electrode 361" are provided on the bottom surface of the recess portion 323. The first fixed electrode 368 is electrically connected to the wiring 77 and the second fixed electrode 369 is electrically connected to the wiring 76. When the acceleration sensor 3 is driven, electrostatic capacitance is formed between the first movable electrode 361' and the first fixed electrode 368 and between the second movable electrode 361" and the second fixed electrode 369, respectively.

When the acceleration Az is applied to the sensor element 36, the movable portion 361 swings around the rotation axis J in a seesaw fashion based on magnitude of the acceleration Az. The gap between the first movable electrode 361' and the first fixed electrode 368 and the gap between the second movable electrode 361" and the second fixed electrode 369 change according to swinging in the seesaw fashion of the movable portion 361, and the electrostatic capacitance between the first movable electrode 361' and the first fixed electrode 368 and the electrostatic capacitance between the second movable electrode 361" and the second fixed electrode 369 change, respectively, as the gap changes. For that reason, it is possible to measure the acceleration Az based on change in the electrostatic capacitance.

The acceleration sensor 3 has been described as above. The acceleration sensor 3 may have at least two sensor elements and for example, one of the sensor elements 34, 35, and 36 may be omitted therefrom, and the other sensor elements may be added thereto. In addition, the configurations of the sensor elements 34, 35, and 36 are not particularly limited.

Here, the substrate 32 of the acceleration sensor 3 will be described again. As illustrated in FIGS. 8 and 9, three recess portions 327, 328, and 329 are formed in the lower surface (the other main surface) of the substrate 32. In plan view from the Z-axis direction, the recess portion 327 includes the sensor element 34, the recess portion 328 includes the sensor element 35, and the recess portion 329 includes the pair of sensor elements 36. In other words, the entire area of the sensor element 34 is positioned inside the recess portion 327 in plan view from the Z-axis direction, the entire area of the sensor element is positioned inside the recess portion 328, and the entire area of the pair of sensor elements 36 is included inside the recess portion 329. The recess portions 327, 328, and 329 are disposed independently of each other, and are disposed so as to be separated from each other. That is, the recess portions 327, 328, and 329 are not connected to other recess portions, respectively. By forming the substrate 32 in such a configuration, the following effects can be exhibited.

As illustrated in FIGS. 3 and 7, in the physical quantity sensor 1, the lower surface (bonding surface 32a) of the substrate 32 is bonded to the bottom surface of the recess portion 211 by the bonding member 91. For that reason, stress caused by thermal distortion of the base 21 or the like can be absorbed and relaxed by the recess portions 327, 328, and 329, and it is difficult for the stress to be transmitted to the sensor elements 34, 35, and 36. Accordingly, it is possible to accurately measure the accelerations Ax, Ay, and Az by the sensor elements 34, 35, and 36. Furthermore, since the recess portions 327, 328, and 329 are disposed so as to be separated from each other, occupancy rates of the recess portions 327, 328, and 329 with respect to the lower surface of the substrate 32 can be reduced as much as possible. For that reason, since the area of the bonding surface 32a is sufficiently wide, the bonding strength between the substrate 32 and the base 21 is excellent.

In particular, in the first embodiment, the recess portions 327, 328, and 329 are not open to the side surface of the substrate 32, respectively, and are constituted with closed recess portions. For that reason, the occupancy rates of the recess portions 327, 328, and 329 with respect to the lower surface of the substrate 32 are further reduced. Accordingly, the area of the bonding surface 32a becomes wider, and the bonding strength between the substrate 32 and the base 21 becomes more excellent.

The bottom surfaces of the recess portions 327, 328, and 329 are separated from the bottom surface of the recess portion 211, respectively. In other words, the bottom surfaces of the recess portions 327, 328, and 329 are not buried with the bonding member 91, and a gap is formed between the bottom surfaces of the recess portions 327, 328, and 329 and the bottom surface of the recess portion 211. For that reason, stress caused by the thermal distortion of the base 21 or the like can be more efficiently absorbed and relaxed by the recess portions 327, 328, and 329, and the stress is less likely to be transmitted to the sensor elements 34, 35, and 36. Accordingly, it is possible to measure the accelerations Ax, Ay, and Az more accurately by the sensor elements 34, 35, and 36. However, the invention is not limited thereto. For example, at least a part (outer edge portion) of the bottom surface of the recess portions 327, 328, and 329 may be in contact with the bonding member 91.

Here, when the depth of each of the recess portions 327, 328, and 329 is D, and the thickness of the substrate 32 is T (see FIGS. 3 and 7), it is preferable that the relationship of $0.1\,T \le D \le 0.2\,T$ is satisfied, and it is more preferable that the relationship $0.12\,T \le D \le 0.17\,T$ is satisfied. With this configuration, it is possible to make the recess portions 327, 328, and 329 to have a depth sufficient to absorb and relieve the stress described above while suppressing an excessive decrease in mechanical strength of the substrate 32. According to such a depth D, it is possible to prevent the bonding member 91 from touching the bottom surfaces of the recess portions 327, 328, and 329, and to absorb and relax stress caused by thermal distortion of the base 21 and the like more efficiently by the recess portions 327, 328, and 329.

As illustrated in FIG. 1, the semiconductor element 5 (control IC chip) is bonded to the upper surface (upper surface of the lid 33) of the acceleration sensor 3 via a bonding member 92. The bonding member 92 is not particularly limited, and various resin adhesives such as epoxy-based adhesive, acrylic-based, silicone-based, and the like, metal brazing material (gold brazing material, silver brazing material, and the like), solder, and the like can be used, for example.

The semiconductor element 5 is electrically connected to a connection pad P of the acceleration sensor 3 via a bonding wire BW1. In such a semiconductor element 5, a drive circuit for applying a drive voltage to the sensor elements 34, 35, and 36, a detection circuit for measuring the accelerations Ax, Ay, and Az based on outputs from the sensor elements 34, 35, and 36, and an output circuit for converting a signal from the detection circuit into a predetermined signal and outputting the signal, and the like are included as necessary.

The physical quantity sensor 1 has been described as above. As described above, such a physical quantity sensor 1 includes the substrate 32, the sensor element 34 (first sensor element) that is positioned on the upper surface (one main surface) side of the substrate 32 and includes the fixed portion 3421 (first fixed portion) fixed to the substrate 32, the sensor element 35 (second sensor element) that is positioned on the upper surface side of the substrate 32 and includes the fixed portion 3521 (second fixed portion) fixed to the substrate 32, and the sensor element 36 (third sensor element) that is positioned on the upper surface side of the substrate 32 and includes the fixed portion 362 (third fixed portion) fixed to the substrate 32. The physical quantity sensor 1 includes the recess portion 327 (first recess portion) that is open to the lower surface (the other main surface) side of the substrate 32 and is disposed so as to be overlapped with the fixed portion 3421 in plan view of the substrate 32, the recess portion 328 (second recess portion) that is opened to the lower surface side of the substrate 32 and is disposed so as to be overlapped with the fixed portion 3521 in plan view of the substrate 32, and the recess portion 329 (third recess portion) that is opened to the lower surface side of the substrate 32 and is disposed so as to be overlapped with the fixed portion 362 in plan view of the substrate 32. The recess portions 327, 328, and 329 are disposed so as to be separated from each other. With this configuration, stress caused by thermal distortion or the like of the base 21 (support substrate) can be absorbed and relaxed by the recess portions 327, 328, and 329. For that reason, it is difficult for the stress to be transmitted to the sensor elements 34, 35, and 36, and the accelerations Ax, Ay, and Az can be accurately measured by the sensor elements 34, 35, and 36. Since the recess portions 327, 328, and 329 are disposed so as to be separated from each other, the area of the lower surface of the substrate 32 can be left sufficiently large, and the bonding strength between the substrate 32 and the base 21 is excellent.

Here, FIGS. 12A to 12C illustrate simulation results illustrating the effect of the first embodiment. FIGS. 12A to 12C illustrate distortion occurring in the substrate 32 in a state where the lower surface of the substrate 32 is bonded to the base 21 via the bonding member 91. However, the recess portions 327, 328, and 329 are omitted from the lower surface of the substrate 32 in FIG. 12A, a recess portion is formed leaving four corners of the lower surface of the substrate 32 as in the related art (see FIG. 6 of JP-A-2006-250702) in FIG. 12B, and the recess portions 327, 328, and 329 are formed in the lower surface of the substrate 32 as in the first embodiment in FIG. 12C. As can be seen from the result of FIGS. 12A to 12C, distortion in FIG. 12C corresponding to the first embodiment is clearly smaller than that in FIGS. 12A and 12B. For that reason, it is proved that the effect described above is reliably exhibited.

As described above, in the physical quantity sensor 1, the recess portion 327 includes the sensor element 34, the recess portion 328 includes the sensor element 35, and the recess portion 329 includes the sensor element 36, in plan view of the substrate 32. For that reason, the recess portions 327, 328, and 329 can be formed to be sufficiently large, and the stress caused by the thermal distortion of the base 21 or the like can be more effectively absorbed and relaxed by the recess portions 327, 328, and 329.

As described above, the physical quantity sensor 1 includes the base 21 (support substrate) disposed on the lower surface side of the substrate 32, and the bonding member 91 which is positioned between the base 21 and the substrate 32 and bonds the upper surface of the base 21 (main surface on the substrate 32 side) and the lower surface of the substrate 32. The bottom surfaces of the recess portions 327, 328, and 329 are separated from the base 21, respectively. For that reason, the stress caused by the thermal distortion of the base 21 or the like can be more efficiently absorbed and relaxed by the recess portions 327, 328, and 329, and the stress is less likely to be transmitted to the sensor elements 34, 35, and 36. Accordingly, it is possible to measure the accelerations Ax, Ay, and Az more accurately by the sensor elements 34, 35, and 36.

The configuration of the physical quantity sensor 1 is not limited to the configuration described above. For example, in the physical quantity sensor 1, the semiconductor element 5 may be omitted. The semiconductor element 5 may be disposed outside the package 2. The semiconductor element 5 may be disposed between the acceleration sensor 3 and the bottom surface of the second recess portion 211b. That is, in contrast to the first embodiment, the semiconductor element 5 may be disposed on the bottom surface of the second recess portion 211b and the acceleration sensor 3 may be disposed on the upper surface of the semiconductor element 5. In this case, the semiconductor element 5 becomes the "support substrate" in the first embodiment.

Also, in the first embodiment, although, in plan view of the substrate 32, the recess portion 327 includes the sensor element 34, the recess portion 328 includes the sensor element 35, and the recess portion 329 includes the sensor element 36, the configuration of the physical quantity sensor 1 is not limited thereto. For example, as illustrated in FIG. 10 and FIG. 11, it suffices that the recess portion 327 is disposed so as to be overlapped with the fixed portion 3421 of at least the sensor element 34, the recess portion 328 is disposed so as to be overlapped with the fixed portion 3521 of at least the sensor element 35, and the recess portion 329 is disposed so as to be overlapped with the fixed portion 362 of at least the sensor element 36. Stresses caused by thermal distortion or the like of the base 21 are particularly transferred from the fixed portions 3421, 3521, and 362 to the sensor elements 34, 35, and 36, and thus, the recess portions 327, 328, and 329 are disposed to be overlapped with the fixed portions 3421, 3521, and 362 so as to make it difficult for the stress to be transmitted to the sensor elements 34, 35, and 36.

Second Embodiment

Next, an inertia measurement device according to a second embodiment will be described.

Figure 13:
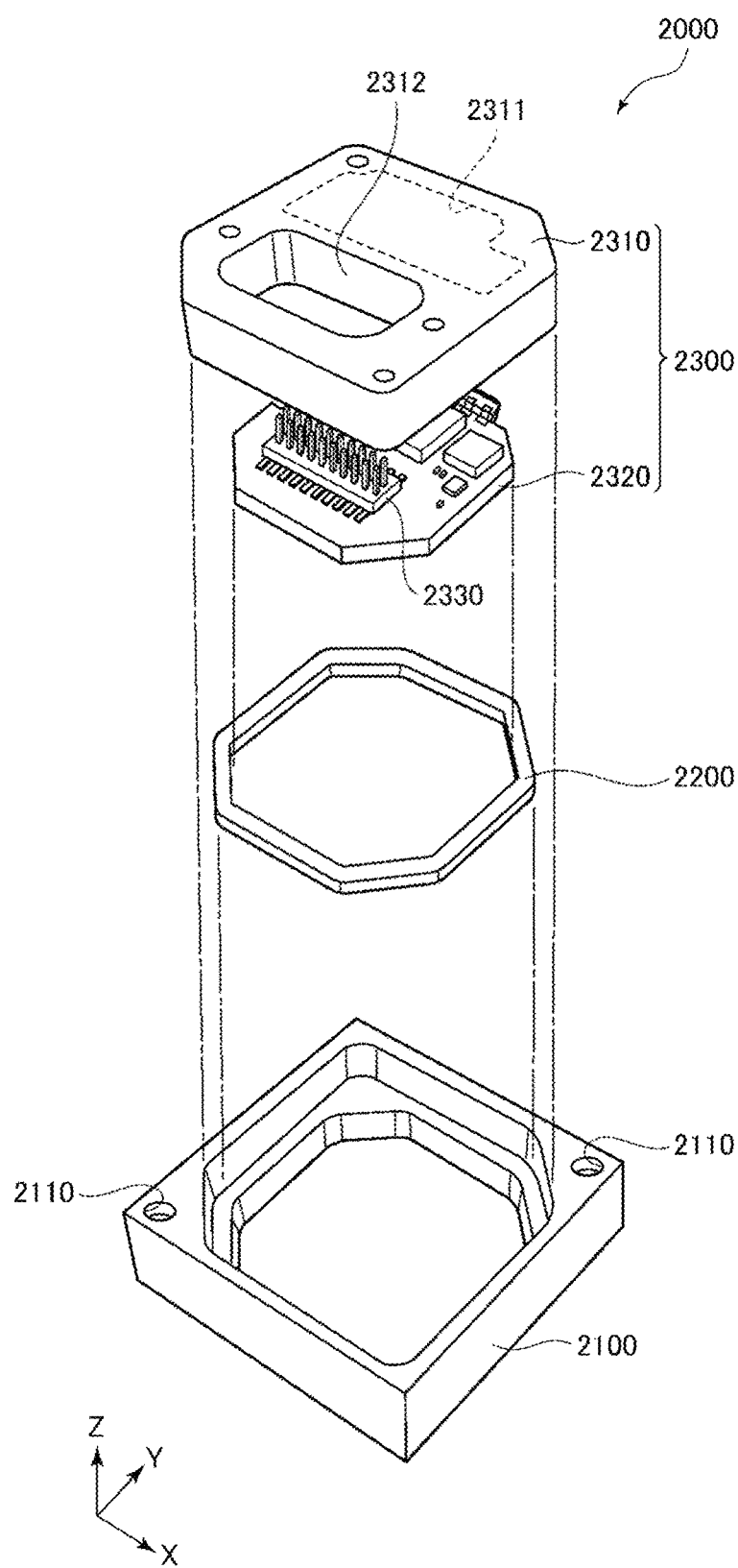
FIG. 13 is an exploded perspective view of an inertia measurement device according to a second embodiment.
Figure 14:
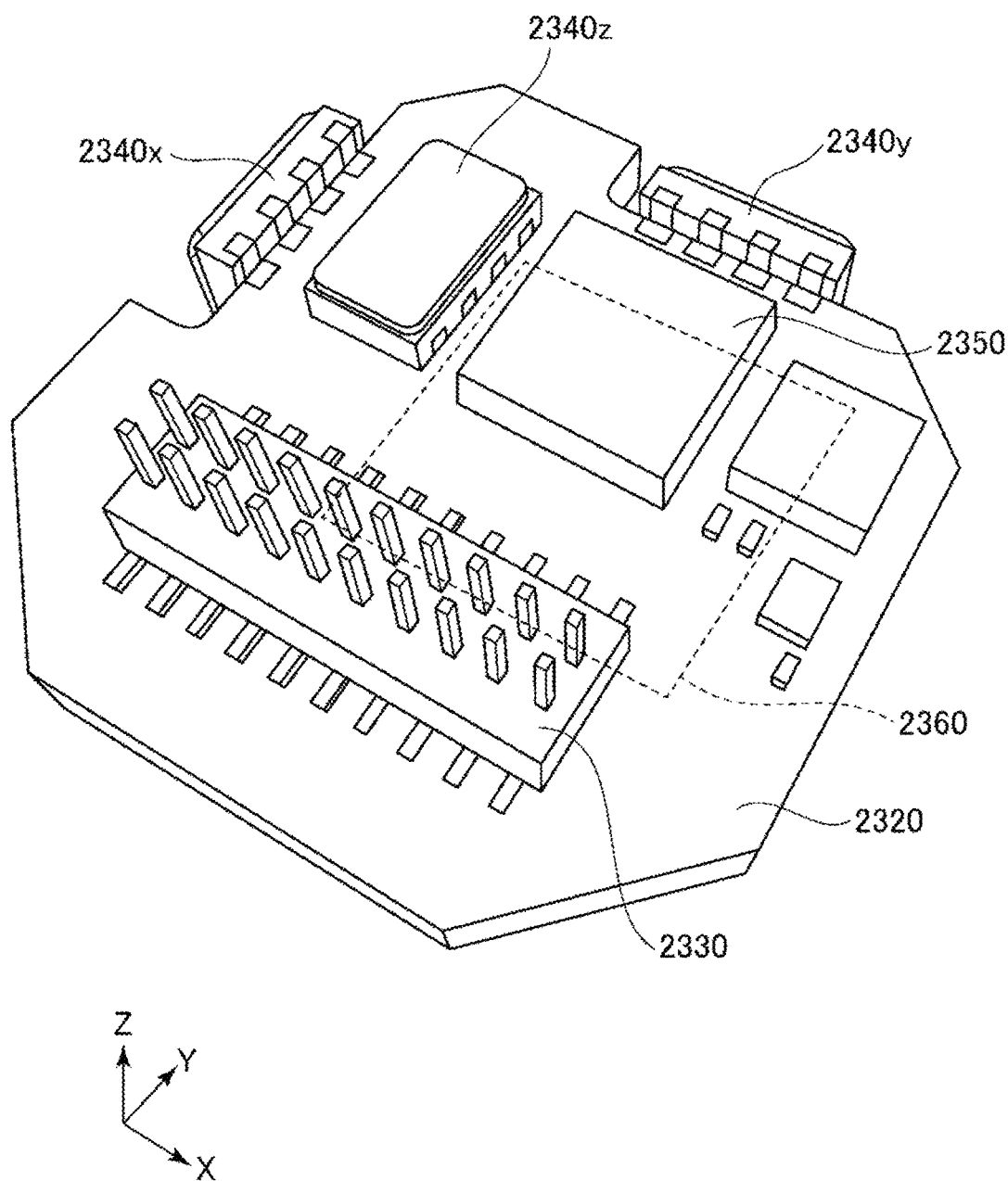
FIG. 14 is a perspective view of a substrate included in the inertia measurement device illustrated in FIG. 13.

FIG. 13 is an exploded perspective view of the inertia measurement device according to the second embodiment. FIG. 14 is a perspective view of a substrate included in the inertia measurement device illustrated in FIG. 13.

An inertia measurement device 2000 (IMU: Inertial Measurement Unit) illustrated in FIG. 13 is a device that detects the attitude and behavior (inertial momentum) of a locomotor (mounted device) such as an automobile or a robot. The inertia measurement device 2000 functions as a so-called six-axis motion sensor including a three-axis acceleration sensor and three-axis angular velocity sensor.

The inertia measurement device 2000 is a rectangular parallelepiped having a substantially square planar shape. Screw holes 2110 as fixed portions are formed in the vicinity of two vertices positioned in the diagonal direction of the square. Through two screws in the two screw holes 2110, the inertia measurement device 2000 can be fixed to the mounted surface of the mounted object such as an automobile. The size of the inertia measurement device 2000 can be reduced to a size that can be mounted on a smartphone or a digital camera, for example, by selection of parts or design change.

The inertia measurement device 2000 has a configuration in which an outer case 2100, a bonding member 2200, and a sensor module 2300 are included and the sensor module 2300 is inserted in the outer case 2100 with the bonding member 2200 interposed therebetween. Further, the sensor module 2300 includes an inner case 2310 and a substrate 2320.

Similarly to the overall shape of the inertia measurement device 2000 described above, the outer shape of the outer case 2100 is a rectangular parallelepiped having a substantially square planar shape, and screw holes 2110 are formed in the vicinity of two vertices positioned in the diagonal direction of the square. In addition, the outer case 2100 has a box shape and the sensor module 2300 is accommodated therein.

The inner case 2310 is a member for supporting the substrate 2320, and has a shape so as to fit inside the outer case 2100. A recess portion 2311 for preventing contact with the substrate 2320 and an opening 2312 for exposing a connector 2330 described later are formed in the inner case 2310. Such an inner case 2310 is bonded to the outer case 2100 via the bonding member 2200 (for example, a packing impregnated with adhesive). The substrate 2320 is bonded to the lower surface of the inner case 2310 via an adhesive.

As illustrated in FIG. 14, a connector 2330, an angular velocity sensor 2340z for measuring the angular velocity around the Z-axis, an acceleration sensor 2350 for measuring acceleration in each axis directions of the X-axis, the Y-axis, and the Z-axis and the like are mounted on the upper surface of the substrate 2320. An angular velocity sensor 2340x for measuring the angular velocity about the X-axis and an angular velocity sensor 2340y for measuring the angular velocity around the Y-axis are mounted on the side surface of the substrate 2320. The angular velocity sensors 2340z, 2340x, and 2340y are not particularly limited, and for example, a vibration gyro sensor using a Coriolis force can be used. In addition, the acceleration sensor 2350 is not particularly limited, and for example, an electrostatic capacitance type acceleration sensor such as the physical quantity sensor 1 of the first embodiment described above can be used.

A control IC 2360 is mounted on the lower surface of the substrate 2320. The control IC 2360 is a micro controller unit (MCU), which includes a storing unit including a nonvolatile memory, an A/D converter, and the like, and controls each unit of the inertia measurement device 2000. In the storing unit, programs defining the order and contents for measuring the acceleration and angular velocity, programs for digitizing detected data and incorporating the detected data into packet data, accompanying data, and the like are stored. A plurality of electronic components are mounted on the substrate 2320 in addition to the control IC 2360.

The inertia measurement device 2000 has been described as above. Such an inertia measurement device 2000 includes the angular velocity sensors 2340z, 2340x, and 2340y and the acceleration sensors 2350 as the physical quantity sensor, and the control IC 2360 (control circuit) for controlling driving of each of these sensors 2340z, 2340x, 2340y, and 2350. With this configuration, the effect of the physical quantity sensor according to the invention can be achieved, and the inertia measurement device 2000 with high reliability can be obtained.

Third Embodiment

Next, a vehicle positioning device according to a third embodiment will be described.

Figure 15:
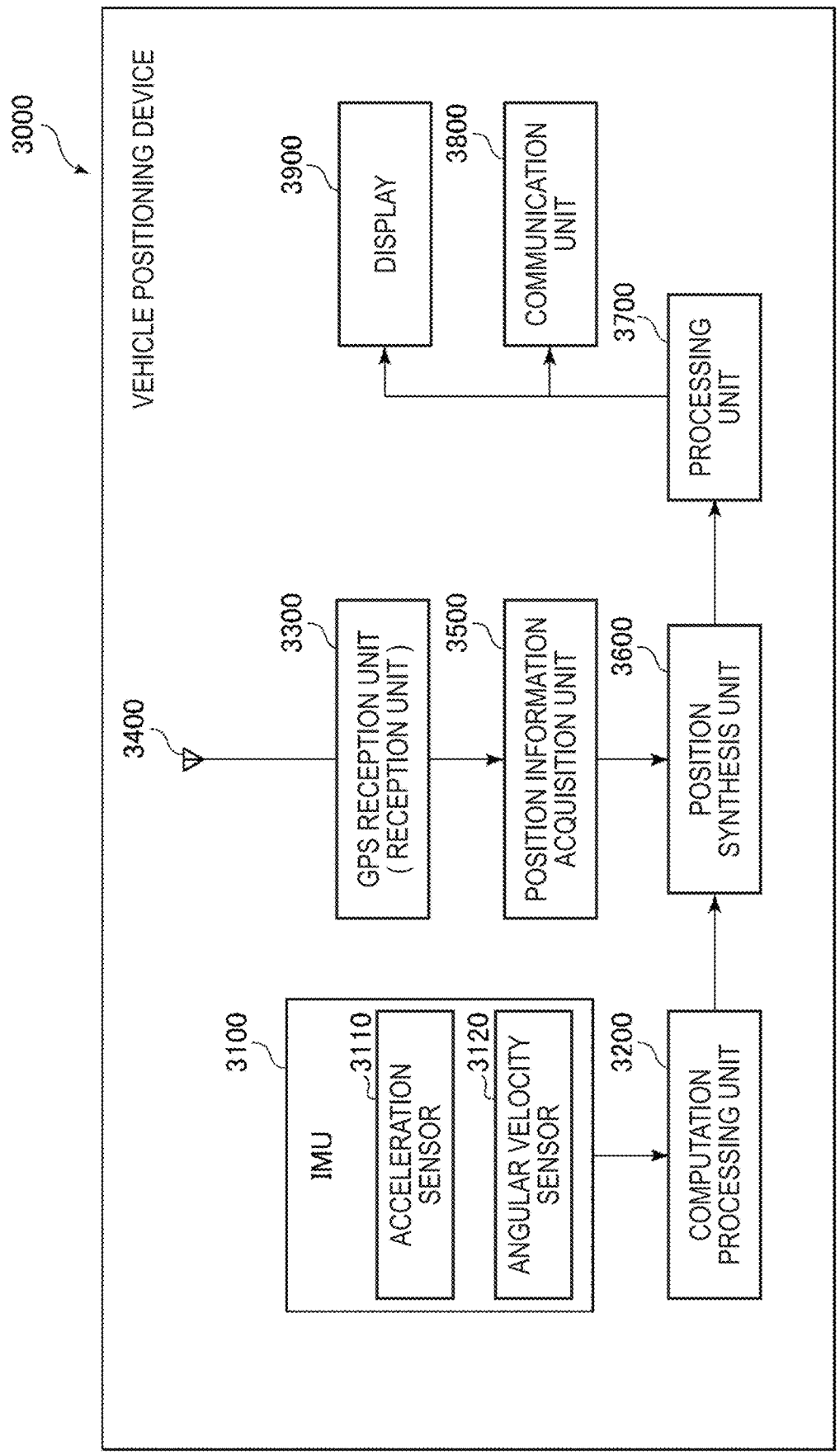
FIG. 15 is a block diagram illustrating an overall system of a vehicle positioning device according to a third embodiment of the invention.
Figure 16:
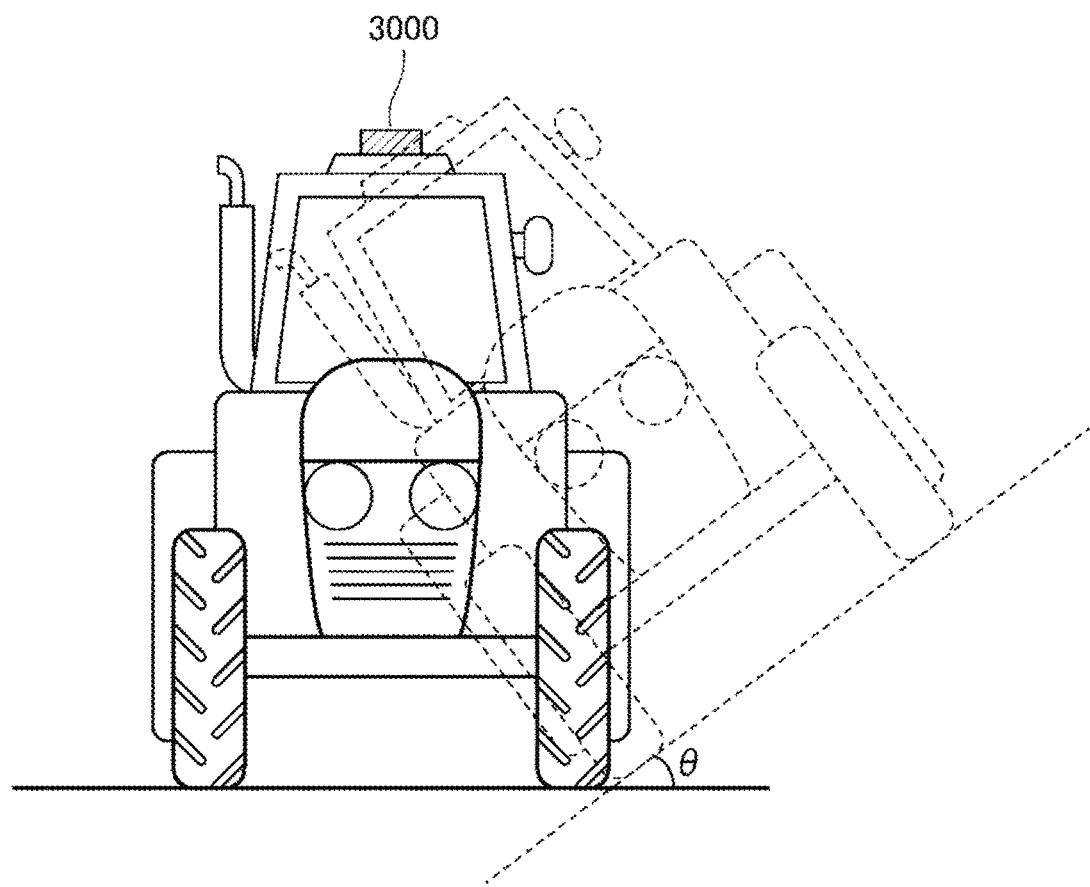
FIG. 16 is a diagram illustrating the operation of the vehicle positioning device illustrated in FIG. 15.

FIG. 15 is a block diagram illustrating the entire system of a vehicle positioning device according to the third embodiment. FIG. 16 is a diagram illustrating the operation of the vehicle positioning device illustrated in FIG. 15.

A vehicle positioning device 3000 illustrated in FIG. 15 is a device which is used by being mounted on a vehicle and performs positioning of the vehicle. The vehicle is not particularly limited, and may be any of a bicycle, an automobile (including a four-wheeled automobile and a motorcycle), a train, an airplane, a ship, and the like, but in the third embodiment, the vehicle is described as a four-wheeled automobile. The vehicle positioning device 3000 includes an inertia measurement device 3100 (IMU), a computation processing unit 3200, a GPS reception unit 3300, a receiving antenna 3400, a position information acquisition unit 3500, a position synthesis unit 3600, a processing unit 3700, a communication unit 3800, and a display 3900. As the inertia measurement device 3100, for example, the inertia measurement device 2000 of the embodiment described above can be used.

The inertia measurement device 3100 includes a tri-axis acceleration sensor 3110 and a tri-axis angular velocity sensor 3120. The computation processing unit 3200 receives acceleration data from the acceleration sensor 3110 and angular velocity data from the angular velocity sensor 3120, performs inertial navigation computation processing on these data, and outputs inertial navigation positioning data (data including acceleration and attitude of the vehicle).

The GPS reception unit 3300 receives a signal (GPS carrier wave, satellite signal on which position information is superimposed) from the GPS satellite via the receiving antenna 3400. Further, the position information acquisition unit 3500 outputs GPS positioning data representing the position (latitude, longitude, altitude), speed, direction of the vehicle positioning device 3000 (vehicle) based on the signal received by the GPS reception unit 3300. The GPS positioning data also includes status data indicating a reception state, a reception time, and the like.

Based on inertial navigation positioning data output from the computation processing unit 3200 and the GPS positioning data output from the position information acquisition unit 3500, the position synthesis unit 3600 calculates the position of the vehicle, more specifically, the position on the ground where the vehicle is traveling. For example, even if the position of the vehicle included in the GPS positioning data is the same, as illustrated in FIG. 16, if the attitude of the vehicle is different due to the influence of inclination of the ground or the like, this means that the vehicle is traveling at different positions on the ground. For that reason, it is impossible to calculate an accurate position of the vehicle with only GPS positioning data. Therefore, the position synthesis unit 3600 calculates the position on the ground where the vehicle is traveling, using inertial navigation positioning data (in particular, data on the attitude of the vehicle). This determination can be made comparatively easily by computation using a trigonometric function (inclination θ with respect to the vertical direction).

The position data output from the position synthesis unit 3600 is subjected to predetermined processing by the processing unit 3700 and displayed on the display 3900 as a positioning result. Further, the position data may be transmitted to the external device by the communication unit 3800.

The vehicle positioning device 3000 has been described as above. As described above, such a vehicle positioning device 3000 includes the inertia measurement device 3100, the GPS reception unit 3300 (reception unit) that receives a satellite signal on which position information is superimposed from a positioning satellite, the position information acquisition unit 3500 (acquisition unit) that acquires position information of the GPS reception unit 3300 based on the received satellite signal, the computation processing unit 3200 (computation unit) that computes the attitude of the vehicle based on the inertial navigation positioning data (inertia data) output from the inertia measurement device 3100, and the position synthesis unit 3600 (calculation unit) that calculates the position of the vehicle by correcting position information based on the calculated attitude. With this configuration, the effect of the inertia measurement device 2000 described above can be achieved, and the vehicle positioning device 3000 with high reliability can be obtained.

Fourth Embodiment

Next, an electronic apparatus according to a fourth embodiment will be described.

Figure 17:
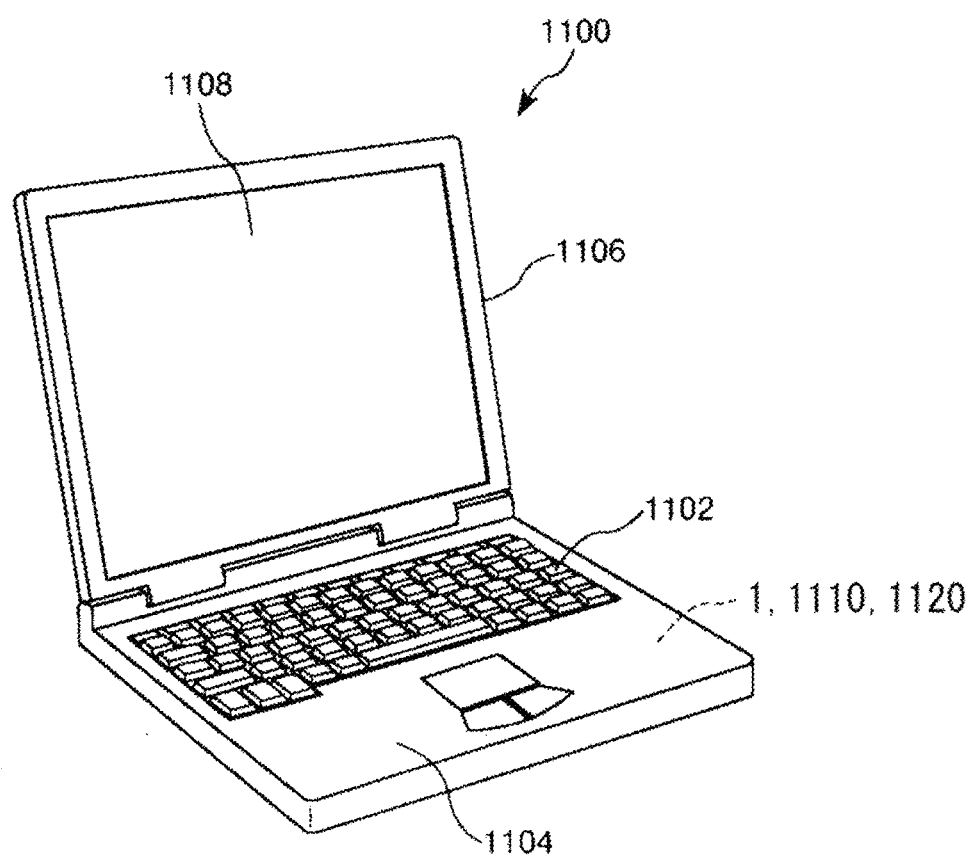
FIG. 17 is a perspective view illustrating an electronic apparatus according to a fourth embodiment.

FIG. 17 is a perspective view illustrating an electronic apparatus according to a fourth embodiment.

The mobile type (or notebook type) personal computer 1100 illustrated in FIG. 17 is a personal computer to which the electronic apparatus of the fourth embodiment is applied. In FIG. 17, the personal computer 1100 is constituted with a main body 1104 including a keyboard 1102 and a display unit 1106 including a display 1108, and the display unit 1106 is supported so as to be rotatable with respect to the main body 1104 via a hinge structure.

In such a personal computer 1100, the physical quantity sensor 1, a control circuit 1110 for controlling driving of the physical quantity sensor 1, a correction circuit 1120 for correcting the physical quantity detected by the physical quantity sensor 1, for example, based on environmental temperature, are built in. The physical quantity sensor 1 is not particularly limited, but any of the embodiments described above can be used, for example.

Such a personal computer 1100 (electronic apparatus) includes the physical quantity sensor 1, the control circuit 1110, and the correction circuit 1120. For that reason, the effect of the physical quantity sensor 1 described above can be achieved and high reliability can be exhibited.

Fifth Embodiment

Next, an electronic apparatus according to a fifth embodiment will be described.

Figure 18:
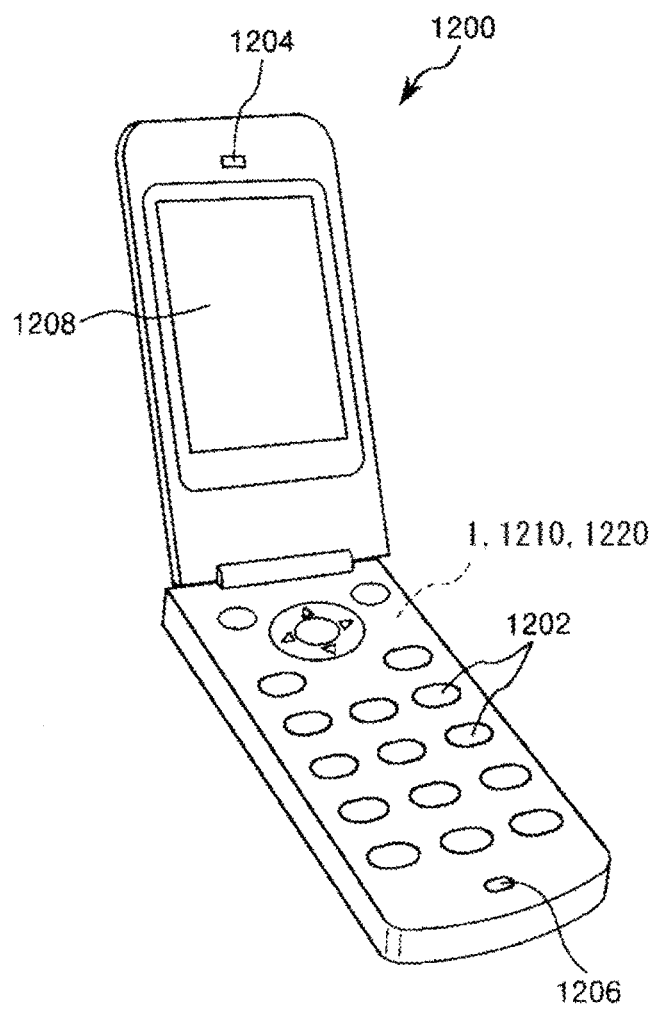
FIG. 18 is a perspective view illustrating an electronic apparatus according to a fifth embodiment.

FIG. 18 is a perspective view illustrating an electronic apparatus according to a fifth embodiment.

The mobile phone 1200 (including PHS) illustrated in FIG. 18 is a mobile phone to which the electronic apparatus of the fifth embodiment is applied. In FIG. 18, the mobile phone 1200 includes an antenna (not illustrated), a plurality of operation buttons 1202, an earpiece 1204, and a mouthpiece 1206, and a display 1208 is disposed between the operation button 1202 and the earpiece 1204.

In such a mobile phone 1200, the physical quantity sensor 1, a control circuit 1210 for controlling driving of the physical quantity sensor 1, a correction circuit 1220 for correcting the physical quantity detected by the physical quantity sensor 1, for example, based on environmental temperature, are built in. The physical quantity sensor 1 is not particularly limited, but any of the embodiments described above can be used, for example.

Such a mobile phone 1200 (electronic apparatus) includes the physical quantity sensor 1, the control circuit 1210, and the correction circuit 1220. For that reason, the effect of the physical quantity sensor 1 described above can be achieved and high reliability can be exhibited.

Sixth Embodiment

Next, an electronic apparatus according to a sixth embodiment will be described.

Figure 19:
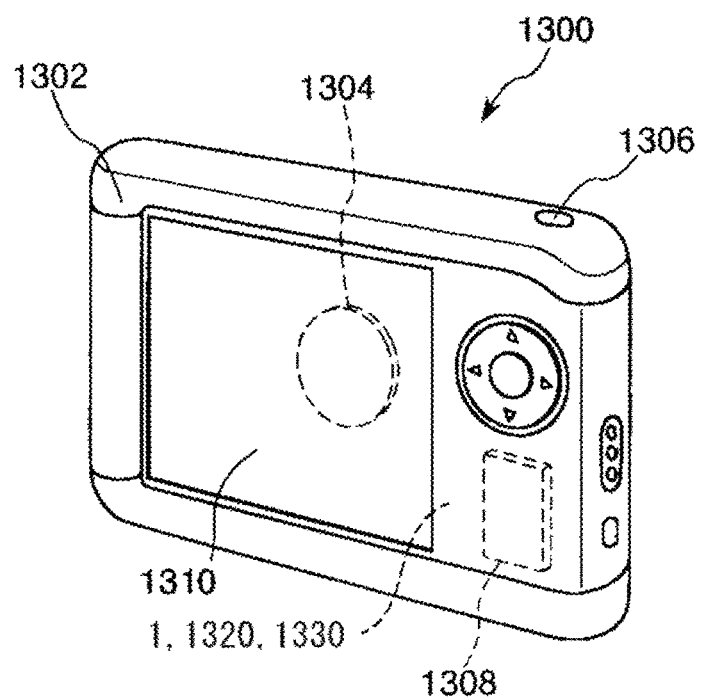
FIG. 19 is a perspective view illustrating an electronic apparatus according to a sixth embodiment.

FIG. 19 is a perspective view illustrating an electronic apparatus according to a sixth embodiment.

A digital still camera 1300 illustrated in FIG. 19 is a digital still camera to which the electronic apparatus of the sixth embodiment is applied. In FIG. 19, a display 1310 is provided on the rear surface of a case 1302, and the display 1310 is configured to perform display based on an imaging signal from the CCD, and the display 1310 functions as a viewfinder for displaying a subject as an electronic image. A light reception unit 1304 including an optical lens (imaging optical system) and a CCD or the like is provided on the front side (back side in the figure) of the case 1302. When a photographer confirms a subject image displayed on the display 1310 and presses a shutter button 1306, the imaging signal of the CCD at that time is transferred to and stored in the memory 1308.

In such a digital still camera 1300, the physical quantity sensor 1, a control circuit 1320 for controlling driving of the physical quantity sensor 1, a correction circuit 1330 for correcting the physical quantity detected by the physical quantity sensor 1, for example, based on environment temperature, are built in. The physical quantity sensor 1 is not particularly limited, but any of the embodiments described above can be used, for example.

Such a digital still camera 1300 (electronic apparatus) includes the physical quantity sensor 1, the control circuit 1320, and the correction circuit 1330. For that reason, the effect of the physical quantity sensor 1 described above can be achieved and high reliability can be exhibited.

In addition to the personal computer and mobile phone of the embodiments described above and the digital still camera of the sixth embodiment, the electronic apparatus of the sixth embodiment can be applied to, for example, a smartphone, a tablet terminal, a clock (including smart watch), an ink jet type discharging device (for example, an ink jet printer), a laptop personal computer, a TV, a wearable terminals such as an HMD (head mounted display), a video camera, a video tape recorder, a car navigation device, a pager, an electronic diary (including with communication function), an electronic dictionary, a calculator, an electronic game machines, a word processor, a work station, a videophone, a security TV monitor, electronic binoculars, a POS terminal, medical equipment (for example, electronic clinical thermometer, blood pressure manometer, blood glucose meter, electrocardiogram measurement device, ultrasonic diagnostic device, electronic endoscope), a fish finder, various measuring instruments, mobile terminal base station equipment, instruments (for example, instruments of vehicles, aircraft, ships), a flight simulator, a network server, and the like.

Seventh Embodiment

Next, a vehicle according to a seventh embodiment will be described.

Figure 20:
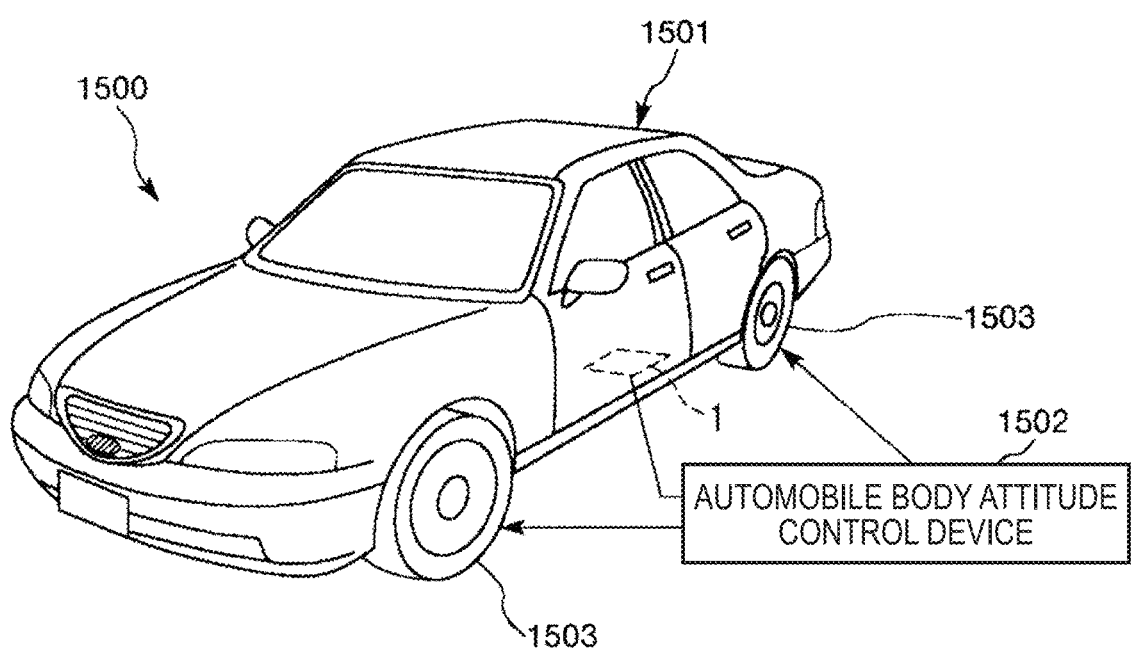
FIG. 20 is a perspective view illustrating a vehicle according to a seventh embodiment.

FIG. 20 is a perspective view illustrating the vehicle according to the seventh embodiment.

An automobile 1500 illustrated in FIG. 20 is an automobile to which the vehicle of the seventh embodiment is applied. In FIG. 20, the physical quantity sensor 1 is built in the automobile 1500, and the attitude of an automobile body 1501 can be detected by the physical quantity sensor 1. The detection signal of the physical quantity sensor 1 is supplied to an automobile body attitude control device 1502 (attitude control unit), and the automobile body attitude control device 1502 detects the attitude of the automobile body 1501 based on the signal, and can control hardness of the suspension or can control the brakes of individual wheels 1503 according to the detected result. Here, as the physical quantity sensor 1, for example, the same physical quantity sensor as that of each of the embodiments described above can be used.

Such an automobile 1500 (vehicle) includes the physical quantity sensor 1 and an automobile body attitude control device 1502 (attitude control unit). For that reason, the effect of the physical quantity sensor 1 described above can be achieved, and high reliability can be exhibited.

The physical quantity sensor 1 can also be widely applied to a car navigation system, a car air conditioner, an anti-lock braking system (ABS), an air bag, a tire pressure monitoring system (TPMS), an engine control, and an electronic control unit (ECU) such as a battery monitor of a hybrid car or an electric automobile.

Also, the vehicle is not limited to the automobile 1500, but can also be applied to unmanned airplanes such as an airplane, a rocket, an artificial satellite, a ship, an automated guided vehicle (AGV), a biped walking robot, a drone, and the like.

Although the physical quantity sensor, the inertia measurement device, the vehicle positioning device, the electronic apparatus, and the vehicle according to the invention have been described based on the illustrated embodiments, the invention is not limited thereto. The configuration of each unit can be replaced with any configuration having the same function. In addition, any other constituent element may be added to the invention. Further, the embodiments described above may be appropriately combined.

In the embodiments described above, although the configuration in which the first sensor element, the second sensor element, and the third sensor element respectively measure acceleration are described, the invention is not limited thereto. For example, a configuration in which each of the first, second, and third sensor elements measures angular velocity may be available. In this case, for example, a configuration in which the first sensor element measures the angular velocity about the X-axis, the second sensor element detects the angular velocity about the Y-axis, and the third sensor element detects the angular velocity about the Z-axis can be adopted. A configuration in which both acceleration and angular velocity are measured using the first sensor element, the second sensor element, and the third sensor element may also be available. For example, in addition to the first sensor element, the second sensor element, and the third sensor element, a fourth sensor element for measuring the angular velocity about the X-axis, a fifth sensor element for measuring the angular velocity around the Y-axis, and a sixth sensor element for measuring the angular velocity around the Z-axis may be included.

Further, in the embodiments described above, although the configuration in which the first sensor element, the second sensor element, and the third sensor element measure accelerations in directions different from each other has been described, the invention is not limited thereto. A configuration in which at least two of the first sensor element, the second sensor element, and the third sensor element measure acceleration in the same direction may be adopted.

In the embodiments described above, although the configuration in which the physical quantity sensor 1 includes the package 2 has been described, but is not limited thereto, and the package 2 may be omitted. Although the base 21 of the package 2 is used as the support substrate, the support substrate is not limited thereto as long as it supports the acceleration sensor 3.

What is claimed is:

1. A physical quantity sensor comprising:
   a substrate having a first major surface and a second and opposite second major surface;
   a first sensor element that is positioned on the first major surface of the substrate and includes a first fixed portion fixed to the substrate;
   a second sensor element that is positioned on the first major surface of the substrate and includes a second fixed portion fixed to the substrate;
   a first recess portion that is provided on the second major surface of the substrate and overlaps the first fixed portion in plan view of the substrate; and
   a second recess portion that is provided on the second major surface of the substrate and overlaps the second fixed portion in plan view of the substrate,
   wherein the first recess portion and the second recess portion are separated from each other.

2. The physical quantity sensor according to claim 1, wherein in plan view of the substrate,
   the first recess portion includes the first sensor element, and
   the second recess portion includes the second sensor element.

3. An inertia measurement device comprising:
   the physical quantity sensor according to claim 2; and
   a control circuit which controls driving of the physical quantity sensor.

4. An electronic apparatus comprising:
   the physical quantity sensor according to claim 2;
   a control circuit; and
   a correction circuit.

5. A vehicle comprising:
   the physical quantity sensor according to claim 2; and
   an attitude control unit.

6. The physical quantity sensor according to claim 1, wherein each of the first recess portion and the second recess portion is separated from a side surface of the substrate.

7. An inertia measurement device comprising:
   the physical quantity sensor according to claim 6; and
   a control circuit which controls driving of the physical quantity sensor.

8. An electronic apparatus comprising:
   the physical quantity sensor according to claim 6;
   a control circuit; and
   a correction circuit.

9. A vehicle comprising:
   the physical quantity sensor according to claim 6; and
   an attitude control unit.

10. The physical quantity sensor according to claim 1, $0.1T \leq D \leq 0.2T$, wherein a depth of each of the first recess portion and the second recess portion is D and a thickness of the substrate is T.

11. An inertia measurement device comprising:
    the physical quantity sensor according to claim 10; and
    a control circuit which controls driving of the physical quantity sensor.

12. An electronic apparatus comprising:
    the physical quantity sensor according to claim 10;

a control circuit; and a correction circuit.

13. The physical quantity sensor according to claim 1, further comprising:

a third sensor element that is positioned on the first major surface of the substrate and includes a third fixed portion fixed to the substrate; and a third recess portion that is provided on the second major surface of the substrate and overlaps the third fixed portion in plan view of the substrate, wherein the third recess portion is separated from each of the first recess portion and the second recess portion.

14. The physical quantity sensor according to claim 13, wherein in plan view of the substrate, the third recess portion includes the third sensor element.

15. The physical quantity sensor according to claim 13, wherein the third recess portion is separated from the side surface of the substrate.

16. The physical quantity sensor according to claim 1, further comprising:

a support substrate that is disposed on the second major surface of the substrate; and a bonding member that is positioned between the support substrate and the substrate and bonds a main surface on the substrate side of the support substrate and the second major surface of the substrate, wherein each of the bottom surfaces of the first recess portion and the second recess portion is separated from the support substrate.

17. An inertia measurement device comprising:

the physical quantity sensor according to claim 1; and a control circuit which controls driving of the physical quantity sensor.

18. A vehicle positioning device comprising:

the inertia measurement device according to claim 17;

a reception unit that receives a satellite signal on which position information is superimposed from a positioning satellite;

an acquisition unit that acquires position information of the reception unit based on the received satellite signal;

a computation unit that computes an attitude of a vehicle based on inertia data output from the inertia measurement device; and a calculation unit that calculates a position of the vehicle by correcting the position information based on the calculated attitude.

19. An electronic apparatus comprising:

the physical quantity sensor according to claim 1;

a control circuit; and a correction circuit.

20. A vehicle comprising:

the physical quantity sensor according to claim 1; and an attitude control unit.

* * * * *